(12) United States Patent
Hayashi et al.

(10) Patent No.: US 6,624,862 B1
(45) Date of Patent: Sep. 23, 2003

(54) DISPLAY OPTICAL APPARATUS HAVING A ROTARY COMPENSATOR TO IMPROVE DISPLAY CONTRAST

(75) Inventors: Kohtaro Hayashi, Toyonaka (JP); Kenji Konno, Sakai (JP); Yasumasa Sawai, Yamatotakada (JP); Nobuyuki Kobayashi, Kobe (JP); Kenji Nishiguchi, Ikoma (JP); Hideki Nagata, Kobe (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/536,914

(22) Filed: Mar. 28, 2000

(30) Foreign Application Priority Data

Mar. 29, 1999 (JP) .......................................... 11-086204
May 14, 1999 (JP) .......................................... 11-133782

(51) Int. Cl.[7] ........................................... G02F 1/1335
(52) U.S. Cl. .......................... 349/119; 349/5; 349/117
(58) Field of Search .............................. 349/5, 117, 119

(56) References Cited

U.S. PATENT DOCUMENTS

| | | | | | |
|---|---|---|---|---|---|
| 5,056,895 A | * | 10/1991 | Kahn | ........................ | 348/751 |
| 5,257,123 A | * | 10/1993 | Shingaki et al. | .............. | 349/72 |
| 5,568,283 A | * | 10/1996 | Mitsutake et al. | ............. | 349/74 |
| 5,570,215 A | * | 10/1996 | Omae et al. | ................. | 349/117 |
| 5,614,962 A | * | 3/1997 | Nagae et al. | ................. | 349/114 |
| 6,016,173 A | * | 1/2000 | Crandall | ....................... | 349/25 |
| 6,157,419 A | * | 12/2000 | Mitsutake | ...................... | 349/9 |
| 6,331,060 B1 | | 12/2001 | Yamamoto et al. | ........... | 353/31 |

FOREIGN PATENT DOCUMENTS

| | | |
|---|---|---|
| JP | 05-249427 A | 9/1993 |
| JP | 06-167717 A | 6/1994 |
| JP | 06-347747 A | 12/1994 |
| JP | 10-161107 A | 6/1998 |

* cited by examiner

*Primary Examiner*—Kenneth Parker
(74) *Attorney, Agent, or Firm*—Sidley Austin Brown & Wood LLP

(57) ABSTRACT

A display optical apparatus is provided with: a polarizing plate transmitting illuminating light having a predetermined polarization direction; a reflective liquid crystal display device reflecting the illuminating light transmitted by the polarizing plate as projected light of a polarization condition that differs according to pixel information for each pixel; and a phase plate changing the polarization conditions of the illuminating light and the projected light and directing the illuminating light and the projected light to the polarizing plate. The phase plate is disposed between the reflective liquid crystal display device and the polarizing plate. The black level of the projected light is adjusted by rotating the principal axis direction of the phase plate.

21 Claims, 22 Drawing Sheets

DISPLAY OPTICAL APPARATUS HAVING A ROTARY COMPENSATOR TO IMPROVE DISPLAY CONTRAST

This application is based on applications No. H11-086204 filed in Japan on Mar. 29, 1999 and No.11-133782 filed in Japan on May 14, 1999, the entire contents of which are hereby incorporated by reference.

BACKGROUND OF THE INVENTION

1. Field of the Invention

The present invention relates to a display optical apparatus using a display panel, and a projector display apparatus using the display apparatus.

2. Description of the Prior Art

Conventionally, as a reflective liquid crystal display device used as a display panel, TN (twisted nematic) liquid crystal, homogeneous liquid crystal and DAP (deformation of aligned phases) liquid crystal have been used. These all perform light modulation by use of the birefringent property of liquid crystal. Of these, the TN liquid crystal has a structure in which the liquid crystal molecules are aligned, from the obverse surface to the rear surface of the display panel, horizontally to the surface of the display panel so as to be twisted at a predetermined angle. To cause the TN liquid crystal to act as a reflective display, the above-mentioned birefringent property is used. While the optical rotatory power is used when the TN liquid crystal is used as a transmissive display device, the present invention is not directed thereto.

The birefringent property is a property to cause a phase difference in the incident light by a polarization plane to thereby modulate the polarization condition. In the TN liquid crystal, at each pixel of the liquid crystal, when no voltage is applied, because of the horizontal alignment, a birefringent effect acts on the incident light to cause the modulation, and when a voltage is applied, the liquid crystal molecules are aligned in a direction vertical to the surface of the display panel, so that no birefringent effect acts on the incident light, particularly on the light vertically incident on the surface and consequently, no modulation is caused.

The homogeneous liquid crystal has a structure in which the liquid crystal molecules are aligned horizontally to the surface of the display panel in a predetermined direction. Like the above-described TN liquid crystal, when no voltage is applied, because of the horizontal alignment, a birefringent effect acts on the incident light to cause the modulation, and when a voltage is applied, the liquid crystal molecules are aligned in a direction vertical to the surface of the display panel, so that no birefringent effect acts on the light vertically incident on the surface and consequently, no modulation is caused.

The DAP liquid crystal has a structure in which the liquid crystal molecules are aligned vertically to the surface of the display panel conversely to the homogeneous liquid crystal. When no voltage is applied, because of the vertical alignment, no birefringent effect acts on the light vertically incident on the surface, so that no modulation is caused. When a voltage is applied, the liquid crystal molecules are aligned in a direction horizontal to the surface of the display panel, so that the birefringent effect acts on the incident light to cause the modulation.

In all of these types of liquid crystal, the display of each pixel is turned on and off according to whether the birefringent effect acts on the incident light or not. That is, when the birefringent effect acts on incident light of a specific polarization condition, the incident light is reflected under a condition where it is modulated to a different polarization condition, and when no birefringent effect acts as incident light, the incident light is reflected under a condition where it is not modulated. To obtain a high-contrast image with a display optical apparatus employing a display panel using such a reflective liquid crystal display device particularly when a projector display apparatus is structured, what is important is the level of black display that is, how completely black is displayed, in other words, how much light can be intercepted at the black portion of the displayed image.

Examples of liquid crystals other than the above-described types include ferroelectric liquid crystal (FLC). In this liquid crystal, unlike the above-described types of liquid crystals, the birefringent effect always acts on the incident light, and the modulation is caused by changing the axial direction of birefringence. Compared to the above-described types of liquid crystals, the ferroelectric liquid crystal has characteristics such as a wide viewing angle, memory capability and fast response. FIG. 15 schematically shows the ferroelectric liquid crystal viewed from the front side of the panel.

Assume that, is shown in α of the figure, the direction of alignment of the liquid crystal molecules m viewed from a direction toward the surface of the display panel p, that is, viewed from the front side is inclined leftward by θ with respect to the broken line 1 representing the reference direction of the figure, for example, when there is no electric field. When an electric field is applied under this condition, as shown in β of the figure, the direction of alignment of the liquid crystal molecules m is inclined rightward by θ with respect to the broken line 1. In the ferroelectric liquid crystal, the modulation is caused by changing the axial direction of birefringence between these two conditions. Antiferroelectric liquid crystal exhibits substantially similar characteristics optically.

An example of the conventional display optical apparatus is one in which a polarizing plate is disposed immediately in front of a display panel. In this apparatus, when incident light having a specific polarization axis and having passed through the polarizing plate is modulated by the display panel, the incident light is reflected with its polarization axis being rotated 90 degrees and returns to the polarization plate. At the polarizing plate, the incident light is intercepted, thereby providing black display. When the incident light is not modulated by the display panel, the incident light is reflected with its polarization axis being as it is and passes through the polarization plate, thereby providing white display or, in the case of the so-called multi-panel type, display of the color of the display panel.

Another conventional example is one in which a PBS (polarization beam splitter) is disposed immediately in front of a display panel. In this apparatus, of the illuminating light illuminating the display panel, for example, only s-polarized light is reflected at the PBS and the reflected s-polarized light is made incident on the display panel. When the s-polarized light is not modulated at the display panel, it is reflected as it is and returns to the PBS. At this time, the s-polarized light is not transmitted by the PBS (but is reflected toward the side of the illuminating light from which it originates), thereby providing black display. When the incident light is modulated by the display panel, it is converted into p-polarized light and reflected, and the p-polarized light is transmitted by the PBS, thereby providing white display or, in the case of the so-called multi-panel type, display of the color of the display panel. Such modulation is generally called cross nicol modulation.

Yet another conventional example is one in which a quarter-wave plate having an axis of phase retardation or an axis of phase advancement forming an angle of 45 degrees with respect to the axis of polarization of a polarizing plate disposed immediately in front of a display panel is disposed between the display panel and the polarizing plate. In this apparatus, when incident light having a specific polarization axis and having passed through the polarizing plate is not modulated by the display panel, the incident light passes through the quarter-wave plate twice in opposite directions to undergo the working of a half-wave plate, so that the polarization axis rotates 90 degrees. Then, the incident light returns to the polarizing plate and is intercepted at the polarizing plate, thereby providing black display.

When the incident light is modulated by the display panel, the incident light undergoes the working of a half-wave plate equivalent to that which the incident light undergoes when it passes twice in opposite directions through the quarter-wave plate having an axis of phase retardation or an axis of phase advancement forming an angle of 45 degrees with respect to the axis of polarization; and further, the incident light actually passes through the quarter-wave plate itself twice in opposite directions to undergo the working of a half-wave plate. Consequently, the condition of the incident light becomes equivalent to that of the incident light having passed through a one wave plate, so that the direction of the polarization axis returns to the original direction (actually, the axis has been rotated 180 degrees) and the incident light passes through the polarizing plate, thereby providing white display or, in the case of the so-called multi-panel type, display of the color of the display panel.

However, in the above-described conventional structure in which the polarizing plate is disposed immediately in front of the display panel, black display is provided when the incident light is modulated by the display panel, and since the optical phase difference varies significantly according to the wavelength, that is, the color of the incident light under such a condition where the birefringent effect is produced by liquid crystal (wavelength dependence), the polarization axis of the incident light does not always rotate exactly 90 degrees when the incident light is modulated, so that the reflected light from the display panel cannot be completely intercepted by the polarizing plate and it is therefore difficult to provide black display. Moreover, an apparatus is known in which black display is provided by correction with a phase difference film or the like. However, the white-to-black image contrast is only approximately 20:1 in this apparatus.

In the above-described conventional structure in which a PBS prism is disposed immediately in front of the display panel and the so-called cross nicol modulation is performed, although it is alright to provide black display when the incident light is not modulated by the display panel, since PSB prisms are generally expensive and in the case of, for example, so-called three-panel projectors, one PBS prism is necessary for each display panel, the cost is extremely high.

When the ferroelectric liquid crystal is used for the display panel, by making the polarization plane of the illuminating light from the PBS prism and the optic axis of the ferroelectric liquid crystal at the time of black display coincide with each other, excellent black display can be provided irrespective of the above-described wavelength dependence and a phase difference error due to a thickness error of the ferroelectric liquid crystal itself described later. However, although a PBS prism for light of a wide wavelength range from R (red) to B (blue) is necessary when a PBS prism is used for structuring a so-called single-panel projector described later in which full advantage of the fast response of the ferroelectric liquid crystal can be taken, such a wide-wavelength-range PBS prism has so-called angle dependence for the angle of incidence, and is inferior in performance such as the extinction ratio described later.

In the above-described conventional structure where a quarter-wave plate having an axis of phase retardation or an axis of phase advancement forming an angle of 45 degrees with respect to the polarization axis of a polarizing plate disposed immediately in front of a display panel is disposed between the display panel and the polarizing plate, although it is alright to provide black display when the incident light is not modulated by the display panel like in the structure in which a PBS prism is disposed, since the quarter-wave plate also has great wavelength dependence, it is impossible to provide perfect black display for incident light of a predetermined wavelength width. Normally, the polarizing plate and the quarter-wave plate are cemented together and used as one unit. The accuracy of the angle between the axis of the polarizing plate and the axis of the quarter-wave plate at the time of the cementing is one degree at the utmost, so that a white-to-black image contrast of not lower than 50:1 cannot be achieved.

There is an apparatus in which in order to cope with the problem of the wavelength dependence of the quarter-wave plate, two phase plates are cemented together so that the wavelength dependence is eliminated and that an effect the same as that of the quarter-wave plate acts on specific incident light. Although this is not completely equivalent to the quarter-wave plate in actuality and has optical rotatory power as well, the same effect as that of the quarter-wave plate acts on specific polarized light having passed through the polarizing plate. However, because of the cementing error of the polarizing plate and the phase plate similar to that described above, or a slight amount of so-called "remaining phase effects" due to the alignment of the liquid crystal molecules or the angle of incidence of the incident light on the liquid crystal, it is difficult to provide perfect black display.

FIGS. 14A to 14C are cross-sectional views schematically showing conditions of liquid crystal where such "remaining phase effects" is caused. FIG. 14A shows a condition where the liquid crystal molecules m are aligned horizontally to the surface s of the display panel p. In this condition, the birefringent effect naturally acts on the incident light to cause the modulation. FIG. 14B shows a condition where the liquid crystal molecules m are aligned vertically to the surface s of the display panel p. In this condition, although no birefringent effect acts on the light vertically incident on the surface s as shown by the arrow A, a slight birefringent effect acts on the light obliquely incident on the surface s as shown by the arrow B.

In the homogeneous liquid crystal described in the prior art, the liquid crystal molecules are horizontally aligned as shown in FIG. 14A when no voltage is applied, and are vertically aligned as shown in FIG. 14B when a voltage is applied. Conversely, in the DAP liquid crystal, the liquid crystal molecules are vertically aligned as shown in FIG. 14B when no voltage is applied, and are horizontally aligned as shown in FIG. 14A when a voltage is applied.

The actual liquid crystal molecules m are not aligned completely vertically to the surface s of the display panel p, but as shown in FIG. 14C, they are slightly inclined from the vertical direction with respect to the surface s of the display panel p even when vertically aligned. Such a condition similarly occurs in the types of liquid crystal described in the prior art. At this time, even if incident light is vertically incident on the surface s as shown by the arrow A, a slight birefringent effect acts on the incident light. It is called "remaining phase effects" that the birefringent effect is produced by the incident light being obliquely incident or by the liquid crystal molecules being slightly inclined from the vertical direction as described above.

In the ferroelectric liquid crystal, no such "remaining phase effects" is caused in principle. Instead, because of the structure in which the birefringent effect always acts and the modulation is caused by changing the axial direction of birefringence, the phase difference error due to the thickness error of the ferroelectric liquid crystal itself is caused. Therefore, because of this error as well as the above-described wavelength dependence of the polarizing plate and the quarter-wave plate, it is also difficult to provide perfect black display with the ferroelectric liquid crystal.

Other examples of the prior art include one using a so-called scattering mode, and a guest-host type. However, high contrast is not obtained in principle in these examples. Another example is one using two polarizing plates, one in front of and the other behind the liquid crystal. However, this structure is inefficient.

SUMMARY OF THE INVENTION

An object of the present invention is to provide a display optical apparatus being simple in structure, excellent in efficiency and low in cost, with which high contrast is obtained, and a projector display apparatus using the display optical apparatus.

To achieve the above-mentioned object of the present invention, a display optical apparatus according to the present invention is provided with: a polarizing plate transmitting illuminating light having a predetermined polarization direction; a reflective liquid crystal display device reflecting the illuminating light transmitted by the polarizing plate as projected light of a polarization condition that differs according to pixel information for each pixel; and a phase plate changing the polarization conditions of the illuminating light and the projected light and directing the illuminating light and the projected light to the polarizing plate. The phase plate is disposed between the reflective liquid crystal display device and the polarizing plate. The black level of the projected light is adjusted by rotating the principal axis direction of the phase plate.

A projector display apparatus according to the present invention is provided with a projection optical system and a display optical apparatus. The display optical apparatus is provided with: a polarizing plate transmitting illuminating light having a predetermined polarization direction; a reflective liquid crystal display device reflecting the illuminating light transmitted by the polarizing plate as projected light of a polarization condition that differs according to pixel information for each pixel; and a phase plate changing the polarization conditions of the illuminating light and the projected light and directing the illuminating light and the projected light to the polarizing plate. The phase plate is disposed between the reflective liquid crystal display device and the polarizing plate. The black level of the projected light is adjusted by rotating a principal axis direction of the phase plate.

BRIEF DESCRIPTION OF THE DRAWINGS

This and other objects and features of this invention will become clear from the following description, taken in conjunction with the preferred embodiments with reference to the accompanying drawings in which.

DESCRIPTION OF THE PREFERRED EMBODIMENTS

Figure 1:
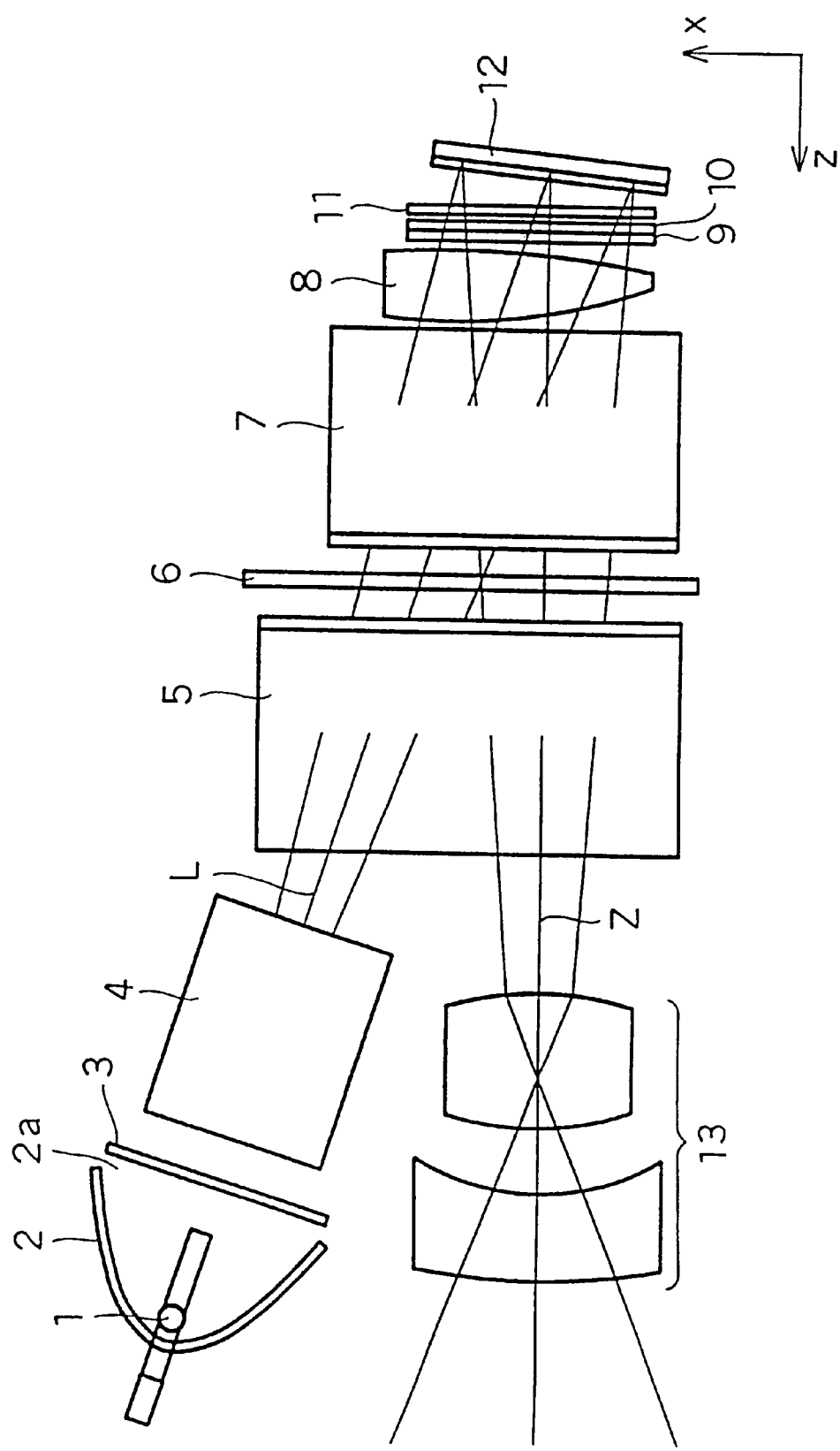
FIG. 1 is a front view showing the principal structure of an embodiment of a projector display apparatus.

Hereinafter, embodiments of the present invention will be described with reference to the drawings. FIG. 1 is a front view showing the principal structure of an embodiment of a projector display apparatus using a display optical apparatus of the present invention. In the figure, reference numeral 1 represents a light source, and reference numeral 2 represents a reflector disposed so as to surround the light source 1. Reference numeral 3 represents a UV-IR cut filter disposed so as to cover the light exit opening 2a of the reflector 2 and cutting ultraviolet rays and infrared rays included in the light from the light source 1 and the reflector 2. In the rear of the UV-IR cut filter 3 (on the right in a downward slanting direction of the figure), an illuminating optical system 4 emitting polarized light having a specific polarization plane as illuminating light is disposed.

In the rear of the illuminating optical system 4, the following elements are disposed in this order: a first dichroic mirror 5 performing color separation and color superimposition; a half-wave plate 6 performing polarization conversion of the illuminating light; and a second dichroic mirror 7 performing color separation and color superimposition. In the rear thereof, a condenser lens 8 whose axis is decentered upward is disposed. The condenser lens 8 condenses the illuminating light on a subsequently-described display panel as incident light, and directs the reflected light from the display panel to a subsequently-described projection optical system as projected light. In the rear of the condenser lens 8, the following elements constituting the display optical apparatus of the present invention are disposed: a polarizing plate 9; a first phase plate 10 which is a half-wave plate; a second phase plate 11 which is a quarter-wave plate; and a display panel 12 using a reflective liquid crystal display device. FIG. 1 shows a structure according to a subsequently-described second or fourth embodiment of the display optical apparatus of the present invention.

As shown in the figure, light from the light source 1 and the reflector 2 passes through the UV-IR cut filter 3 and the illuminating optical system 4, and then passes through the above-mentioned optical elements 5 to 11 to be incident on the display panel 12 from the upper left in a slightly slanting direction with its optical axis being the optical axis L. The display panel 12 is disposed so as to be slightly inclined rightward from the vertical direction of the figure. The incident light incident on the display panel 12 is reflected leftward in the horizontal direction of the figure as reflected light and again passes through the optical elements 11 to 5 in the opposite direction to be directed to the projection optical system 13. The incident light is image-projected as projected light by the projection optical system 13. The optical axis of the projection optical system 13 is designated as Z. As for the coordinates, the leftward direction on the plane of the figure is the z axis, the upward direction is the x axis, and the direction vertical to the plane of the figure and toward this side is the y axis. That is, FIG. 1 shows the x-z plane.

Figure 2:
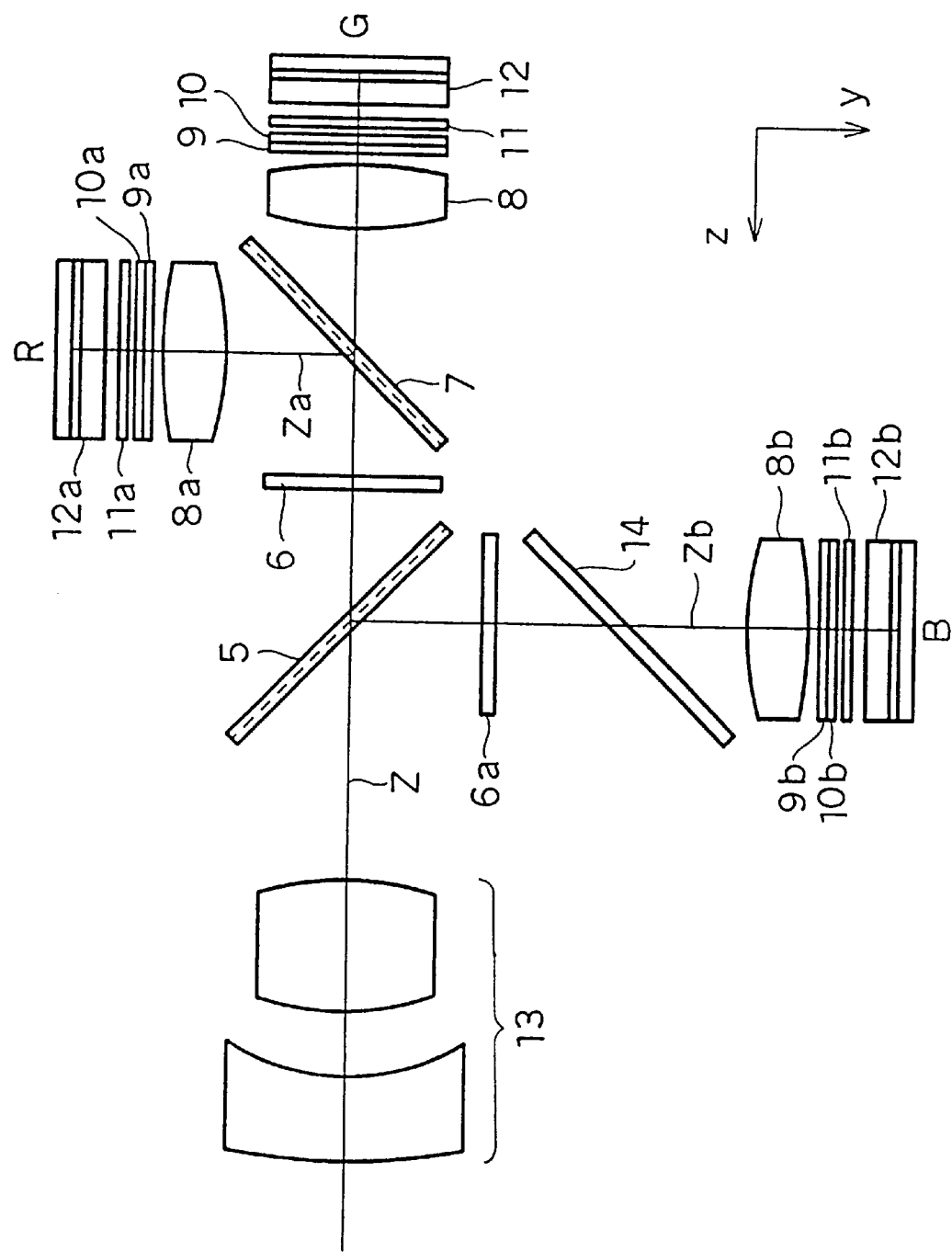
FIG. 2 is a plan view showing the principal structure of the embodiment of the projector display apparatus.

FIG. 2 is a plan view showing the principal structure of the embodiment of the projector display apparatus using the display optical apparatus of the present invention. This figure shows the z-y plane including the optical axis Z of the projection optical system 13 shown in FIG. 1. As shown in FIG. 2, the projector display apparatus of this embodiment is a so-called three-panel type. When the display panel 12 performs image display of, for example, G (green), a display panel 12a performs image display of, for example, R (red) and a display panel 12b performs image display of B (blue).

Immediately in front of the display panel 12a, a condenser lens 8a, a polarizing plate 9a, a first phase plate 10a and a second phase plate 11a are disposed in this order from the illumination side similarly to the case of the display panel 12 described with reference to FIG. 1. Likewise, immediately in front of the display panel 12b, a condenser lens 8b, a polarizing plate 9b, a first phase plate 10b and a second phase plate 11b are disposed in this order from the illumination side.

The illuminating light incident with its optical axis being the optical axis L shown in FIG. 1 is color-separated by the first dichroic mirror 5. The light reflected at the dichroic mirror 5 passes through a half-wave plate 6a and a dummy glass 14 shown in FIG. 2 and then passes through the optical elements 8b to 11b to be incident on the display panel 12b. The dummy glass 14 has the function of making optical paths optically equivalent instead of a dichroic mirror. The incident light incident on the display panel 12b again passes through the optical elements 11b to 8b, 14 and 6a along the optical axis Zb in the opposite direction to return to the first dichroic mirror 5.

The illuminating light transmitted by the first dichroic mirror 5 passes through the half-wave plate 6 and is color-separated by the second dichroic mirror 7. The light reflected at the second dichroic mirror 7 passes through the optical elements 8a to 11a to be incident on the display panel 12a. The incident light incident on the display panel 12a again passes through the optical elements 11a to 8a in the opposite direction along the optical axis Za to return to the second dichroic mirror 7. The light rays from the display panels 12 and 12a are superimposed by the second dichroic mirror 7 and the light ray from the display panel 12b is further superimposed thereon by the first dichroic mirror 5. The superimposed light rays are directed to the projection optical system 13 and image-projected by the projection optical system 13 as projected light. The optical paths of the incident light and the reflected light of each display panel are optically equivalent.

As a projector display apparatus using reflective display panels, a type using the above-mentioned PBS prisms has been conventionally used. However, the cost is lower when polarizing plates are used like in this embodiment. Recently, projector display apparatuses have been required to have a white-to-black image contrast of 100:1 to 300:1. In the structure using polarizing plates immediately in front of display panels as shown in this embodiment, reflection occurs at the condenser lens, a trimming filter and the surface of the polarizing plate before the illuminating light reaches the display panel, so that the contrast is reduced.

Therefore, it is necessary that the contrast, that is, the extinction ratio in the structure including the elements from the polarizing plate to the display panel be not less than 150:1 at the time of black display. The trimming filter transmits only light of the wavelength range of each display panel so that the color purity is excellent. To decrease the contrast reduction due to the surface reflection at the polarizing plate and the phase plate, it is preferable that the trimming filter, the polarizing plate and the phase plate be inclined at 3 to 10 degrees with respect to the display panel. In addition, it is necessary to reduce the surface reflection, for example, by cementing a polarizing plate to the trimming filter.

Figure 3:
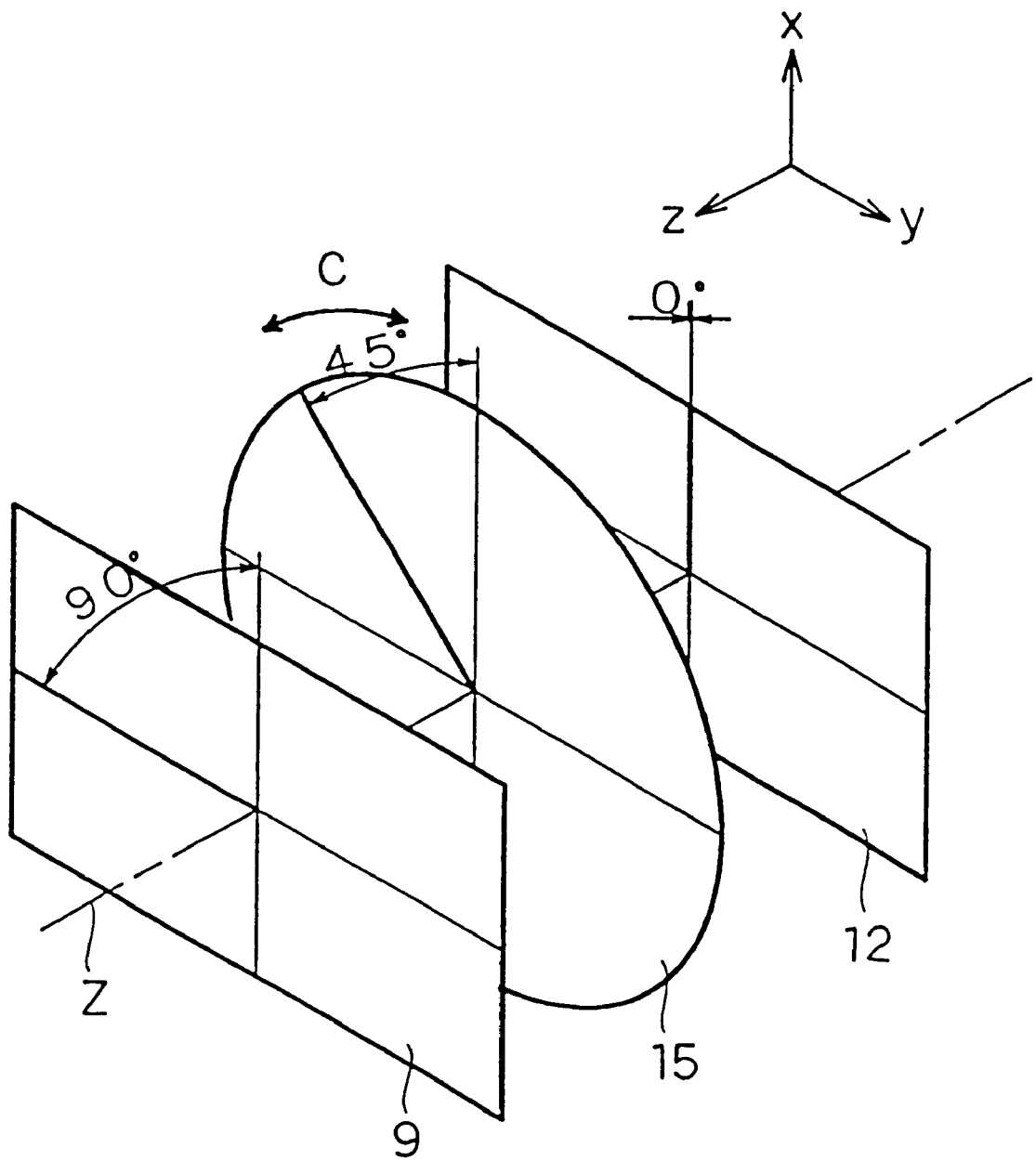
FIG. 3 is a perspective view schematically showing a first embodiment of a display optical apparatus of the present invention.

FIG. 3 is a perspective view schematically showing a first embodiment of the display optical apparatus of the present invention. As shown in the figure, in this embodiment, a polarizing plate 9, a phase plate 15 (called a single phase plate) which is a quarter-wave plate, and a display panel 12 which is a reflective liquid crystal display device are disposed in this order, for example, on the optical axis Z of the projection optical system. In the figure, as for the coordinates, the projection direction along the optical axis Z is the z axis, the upward direction vertical to the z axis is the x axis, and the rightward direction vertical to the z axis is the y axis. These coincide with the coordinates shown in FIGS. 1 and 2.

The liquid crystal used for the display panel 12 is the homogeneous or the DAP liquid crystal. Here, the axial direction of the liquid crystal molecules of the display panel 12 when the liquid crystal molecules are horizontally aligned is 0 degrees, and coincides with the x axis. On the contrary, the polarization axis of the polarizing plate 9 is at 90 degrees, and the phase plate 15 has an axis of phase retardation of 45 degrees. While so far the structure is the same as that of the above-described conventional example, in this embodiment adjustment is made by rotating the phase plate 15, for example, about the optical axis Z as shown by the arrow C.

Figure 14A:
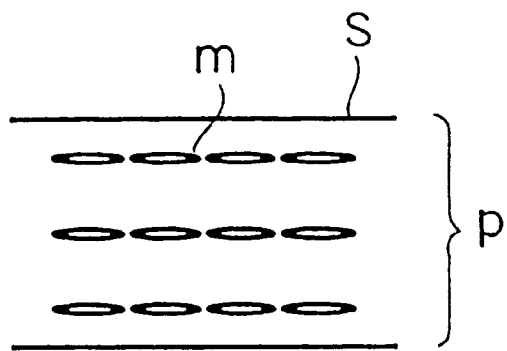
FIGS. 14A to 14C are cross-sectional views schematically showing the conditions of liquid crystal that cause the "remaining phase effects"
Figure 14B:
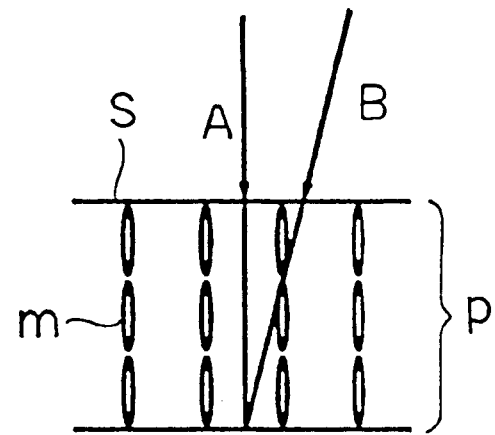
Figure 14C:
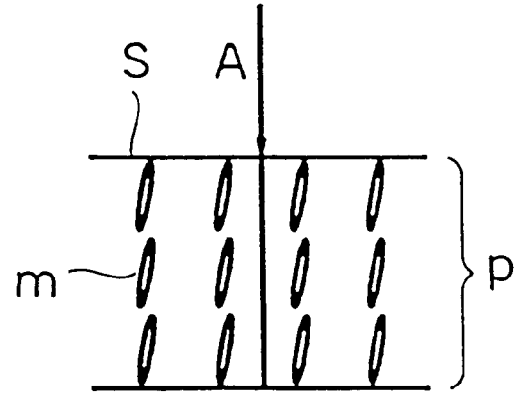
Figure 15:
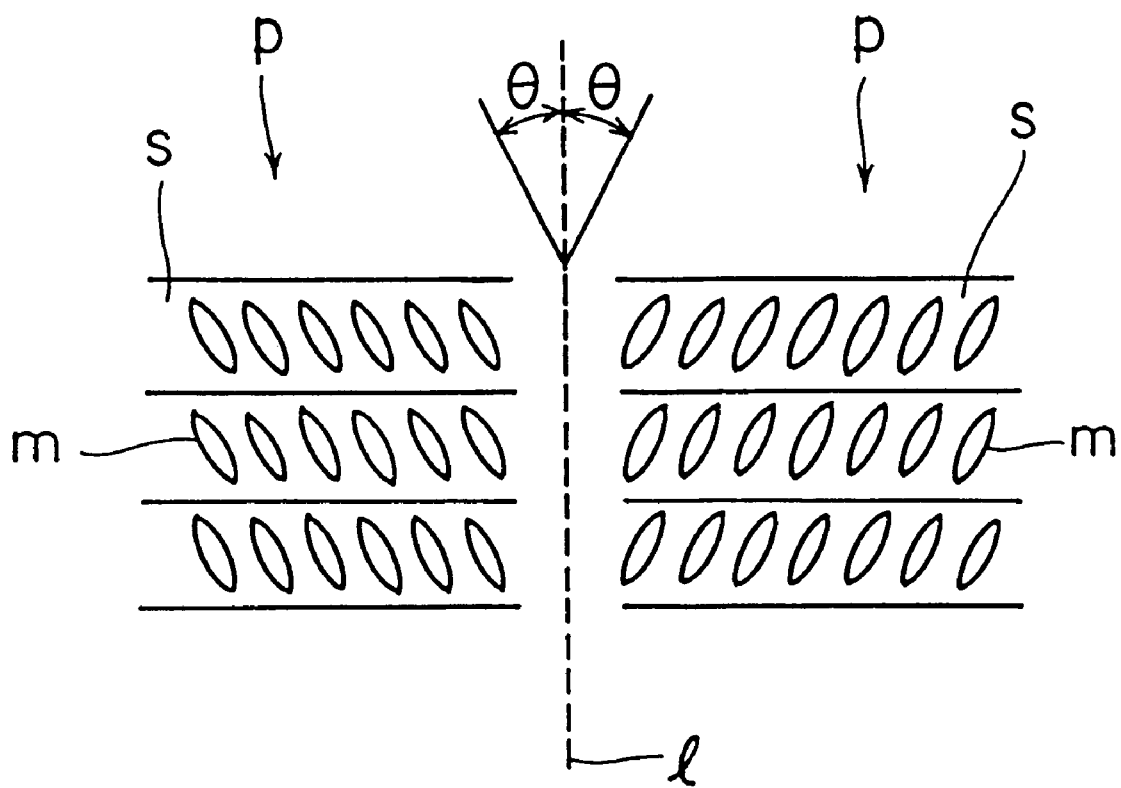
FIG. 15 schematically shows the ferroelectric liquid crystal viewed from the front side of the panel.

By this, the slight amount of so-called "remaining phase effects" due to the alignment of the liquid crystal molecules or the angle of incidence of the incident light on the liquid crystal described with reference to FIGS. 14A to 14C is canceled. In FIG. 3, while the surfaces of the polarizing plate 9 and the phase plate 15 are vertical to the optical axis Z, the surface of the display panel 12 is inclined away at 3 to 10 degrees along the x-z plane. This is similar to the disposition of the display panel 12 shown in FIG. 1.

Figure 4:
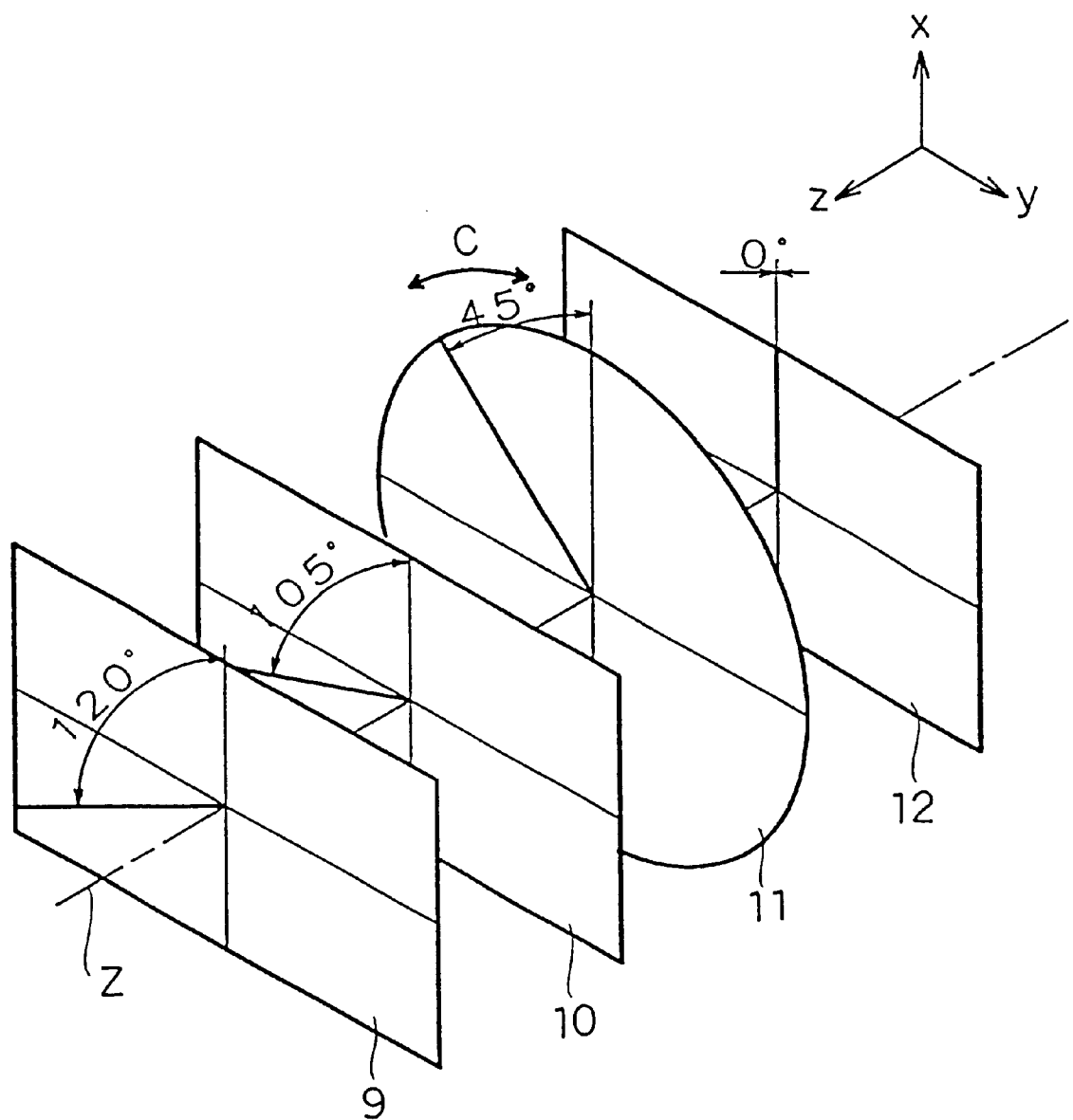
FIG. 4 is a perspective view schematically showing a second embodiment of the display optical apparatus of the present invention.

FIG. 4 is a perspective view schematically showing a second embodiment of the display optical apparatus of the present invention. As shown in the figure, in this embodiment, a polarizing plate 9, a first phase plate 10 which is a half-wave plate, a second phase plate 11 which is a quarter-wave plate (these phase plates together are referred to as a compound phase plate), and a display panel 12 which is a reflective liquid crystal display device are disposed in this order, for example, on the optical axis Z of the projection optical system. In this figure, the coordinates are the same as those shown in FIG. 3.

The liquid crystal used for the display panel 12 is the homogeneous or the DAP liquid crystal. Here, the axial direction of the liquid crystal molecules of the display panel 12 when the liquid crystal molecules are horizontally aligned is 0 degrees, and coincides with the x axis. On the contrary, the polarization axis of the polarizing plate 9 is at 120 degrees, the first phase plate 10 has an axis of phase retardation of 105 degrees, and the second phase plate 11 has an axis of phase retardation of 45 degrees. In this embodiment, adjustment is made by rotating the second phase plate 11, for example, about the optical axis Z as shown by the arrow C.

By this, the slight amount of so-called "remaining phase effects" due to the alignment of the liquid crystal molecules or the angle of incidence of the incident light on the liquid crystal described with reference to FIGS. 14A to 14C is canceled. In FIG. 4, while the surfaces of the polarizing plate 9, the first phase plate 10 and the second phase plate 11 are vertical to the optical axis Z, the surface of the display panel 12 is inclined away at 3 to 10 degrees along the x-z plane. This is similar to the disposition of the display panel 12 shown in FIG. 1.

In the structure using a single quarter-wave plate (phase plate 15) shown in the first embodiment, because of the wave-length dependence of the refractive index difference $\Delta n$ of the phase plate, R/$\lambda$ varies due to the wavelength dependence, so that the black level increases in a predetermined wavelength range to reduce the contrast. Here, R=$\Delta n \cdot d$, $\lambda$ is the wavelength of transmitted light, and d is the thickness of the phase plate. The quarter-wave plate is basically set so that R/$\lambda$=¼. Ideally, it is desirable for R/$\lambda$ to be fixed.

The projector optical apparatus of the present invention employs the three-panel structure as embodiments as described above. Each display panel is illuminated with light of a single color, but the light of the single color, although mentioned as single, has a wavelength width of approximately 0.08 $\mu$m. For example, in the case of G (green), the wavelength range is approximately 0.51 to 0.58 $\mu$m. To achieve the contrast, that is, an extinction ratio of 150:1 at the liquid crystal under such a condition, a black level ratio of not more than 1% must be achieved at least in the entire region of the wavelength range used by each display panel.

In the second embodiment, by using a combination of a half-wave plate and a quarter-wave plate as the phase plate instead of a single quarter-wave plate, a property similar to that produced when a single quarter-wave plate is used acts on the polarized light having a polarization axis in the direction of 120 degrees and having passed through the polarizing plate 9 shown in FIG. 4, and additionally, the wavelength dependence can be reduced. Moreover, in this embodiment, when a "remaining phase effects" R/$\lambda$ of, for example, 0.03 is caused by the liquid crystal, theoretically, by making adjustment by rotating the second phase plate 11 from 45 degrees to 47.7 degrees, the black level can be reduced to increase the contrast. The actual adjustment is made by locating the adjustment position where the contrast is highest by rotating the phase plate while viewing the image.

When the angle of incidence of the illuminating light being obliquely incident on the display panel is large, the "remaining phase effects" due to the oblique incidence is large. Therefore, to reduce the influence of the "remaining phase effects" by the rotation adjustment, it is desirable that the angles between the principal ray cross section including the optical axis L of the illuminating light in FIG. 1, that is, the x-z plane and the axes of the polarizing plate 9, the first phase plate 10 and the second phase plate 11 be as shown in FIG. 4.

When the inclination amount of the liquid crystal molecules as shown in FIG. 14C at the time of vertical alignment is large, the "remaining phase effects" due to the inclination is also large. Therefore, to reduce the influence of the "remaining phase effects" by the rotation adjustment, considering that the direction of the slight inclination at the time of vertical alignment is the same as the direction of alignment at the time of horizontal alignment, it is desirable that, when the direction of alignment at the time of horizontal alignment is the direction of 0 degrees of FIG. 4 as mentioned above, the angles between the axes of the polarizing plate 9, the first phase plate 10 and the second phase plate 11 and the alignment direction at the time of the horizontal alignment be as shown in the figure.

By making the principal ray cross section due to the oblique incidence and the direction of alignment at the time of horizontal alignment coincide with each other like in this embodiment or form an angle of 90 degrees therebetween, adjustment can be made for both the "remaining phase effects" due to the alignment of the liquid crystal molecules and the "remaining phase effects" due to the incidence angle of the light incident on the liquid crystal. By such an adjustment mechanism, angular errors of the polarizing plate and the phase plate caused at the time of assembly can also be adjusted as well as the two kinds of "remaining phase effects".

Figure 5:
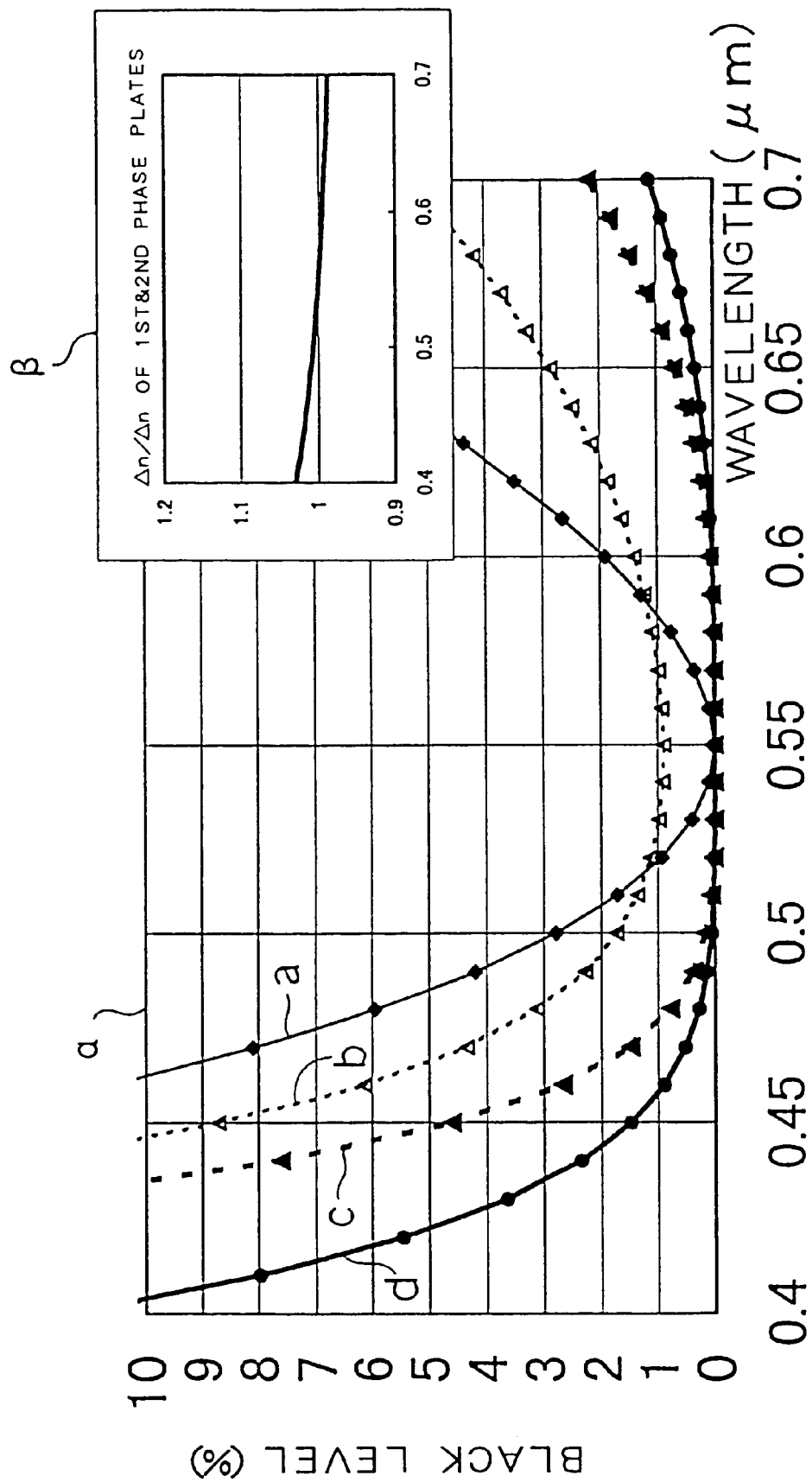
FIG. 5 graphically shows the wavelength dependence of the structures of the first and the second embodiments.

FIG. 5 graphically shows the wavelength dependence in the structures of the first and the second embodiments. In the graph α of the figure, the horizontal axis represents the wavelength of the light being used, and the vertical axis represents the ratio of the black level in percent. In the graph β of the figure, the horizontal axis represents the wavelength of the light being used, and the vertical axis represents the ratio of the refractive index difference between the first and the second phase plates in the case where the reference wavelength is 0.55 μm. In the graph α of the figure, in the case where a single phase plate is used like in the first embodiment, as shown by ♦ and the thin solid line a, the ratio of the black level is high because of the wavelength dependence except in the vicinity of the reference wavelength 0.55 μm even if adjustment is made.

In the case where a compound phase plate is used like in the second embodiment, when no adjustment is made and the "remaining phase effects" R/λ of the liquid crystal remains 0.03, the ratio of the black level is high even in the vicinity of the reference wavelength 0.55 μm as shown by Δ and the thin broken line b. However, by making an adjustment with the second phase plate, the ratio of the black level can be restrained over a wide wavelength range as shown by ▼ and the thick broken line c. Here, λ0 represents the reference wavelength. Further, in the case where a compound phase plate is used, when there is no "remaining phase effects" of liquid crystal, the ratio of the black level can be restrained over an extremely wide wavelength range as shown by ● and the thick solid line d.

Figure 6:
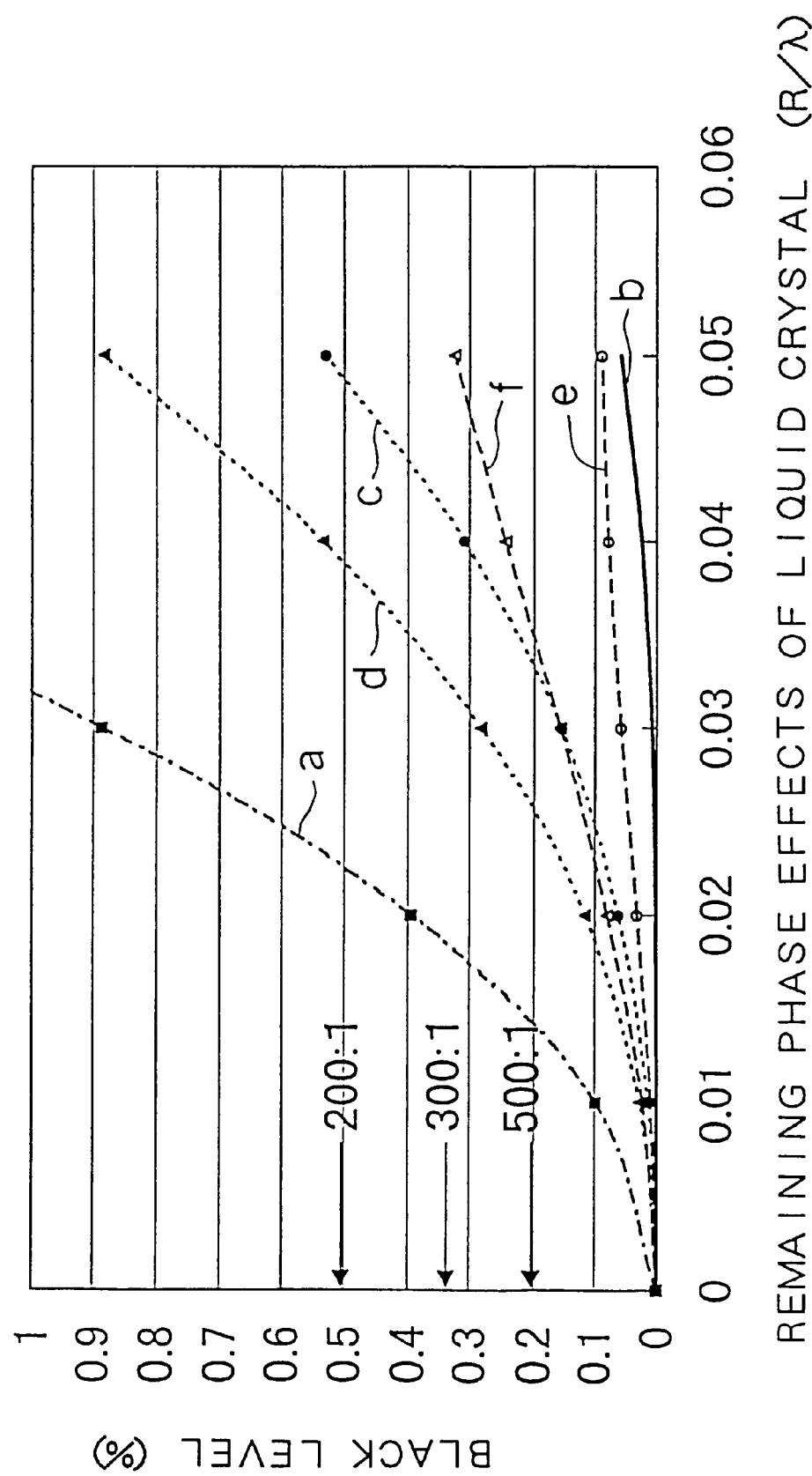
FIG. 6 graphically shows the contrast due to "remaining phase effects" of liquid crystal.

FIG. 6 graphically shows the contrast due to the "remaining phase effects" of liquid crystal. In this figure, the horizontal axis represents the amount of "remaining phase effects" caused by liquid crystal, and the vertical axis represents the ratio of the black level in percent. While in the second embodiment, the principal ray cross section of the illuminating light due to oblique incidence or the alignment direction of the liquid crystal at the time of horizontal alignment is at 45 degrees with respect to the axis of phase retardation of the second phase plate as described above, FIG. 6 shows a case where this angular relationship is broken, that is, a case where the axis of phase retardation of the liquid crystal due to horizontal alignment or the principal ray cross section shifts from the direction of 0 degrees shown in FIG. 4 by several steps.

In the figure, first, when the adjustment with the second phase plate is not made, the ratio of the black level rapidly increases as the "remaining phase effects" of the liquid crystal increases as shown by ■ and the dash and dotted line a. Then, after the adjustment with the second phase plate is made, when the axis of phase retardation of the liquid crystal is at 0 degrees, the ratio of the black level is sufficiently restrained as shown by the solid line b even if the "remaining phase effects" of the liquid crystal increases. When the axis of phase retardation of the liquid crystal is at 10 degrees, the ratio of the black level can be restrained approximately to 0.5% as shown by ● and the dotted line c even when the "remaining phase effects" is 0.05. However, when the axis of phase retardation of the liquid crystal is at 15 degrees, the ratio of the black level jumps to 0.9% as shown by ▼ and the dotted line d.

When the axis of phase retardation of the liquid crystal is at −10 degrees, the ratio of the black level can be restrained approximately to 0.1% as shown by ○ and the broken line e even when the "remaining phase effects" is 0.05, and when the axis of phase retardation of the liquid crystal is at −15 degrees, the ratio of the black level is restrained to 0.3% as shown by Δ and the broken line f. The black level after the adjustment differs between the plus side and the minus side of the axis of phase retardation of the liquid crystal as described above because of the structure of the adjustment mechanism. While in this embodiment, the adjustment is made only with the second phase plate and the performance on the minus side improves, when the adjustment is made with the first phase plate and the second phase plate integrated together, the performance on the plus side improves. The angle of 45 degrees between the axis of phase retardation of the second phase plate and the axis of phase retardation of the liquid crystal may be either on the plus side or on the minus side.

Since the contrast at a specific wavelength is shown in the figure, considering a contrast reduction due to the above-described wavelength dependence, it is necessary that the ratio of the black level be not more than 0.5% at such a specific wavelength. When the maximum "remaining phase effects" R/λ of the liquid crystal is 0.05, from the graph, it is necessary that the angle between the axes of phase retardation be within a range of ±10 degrees from 45 degrees. As shown by the vertical axis, when the ratio of the black level is approximately 0.2%, an extinction ratio of 500:1 is obtained, when the ratio of the black level is between 0.3 to 0.4%, an extinction ratio of 300:1 is obtained, and when the ratio of the black level is approximately 0.5%, an extinction ratio of 200:1 is obtained.

Figure 7:
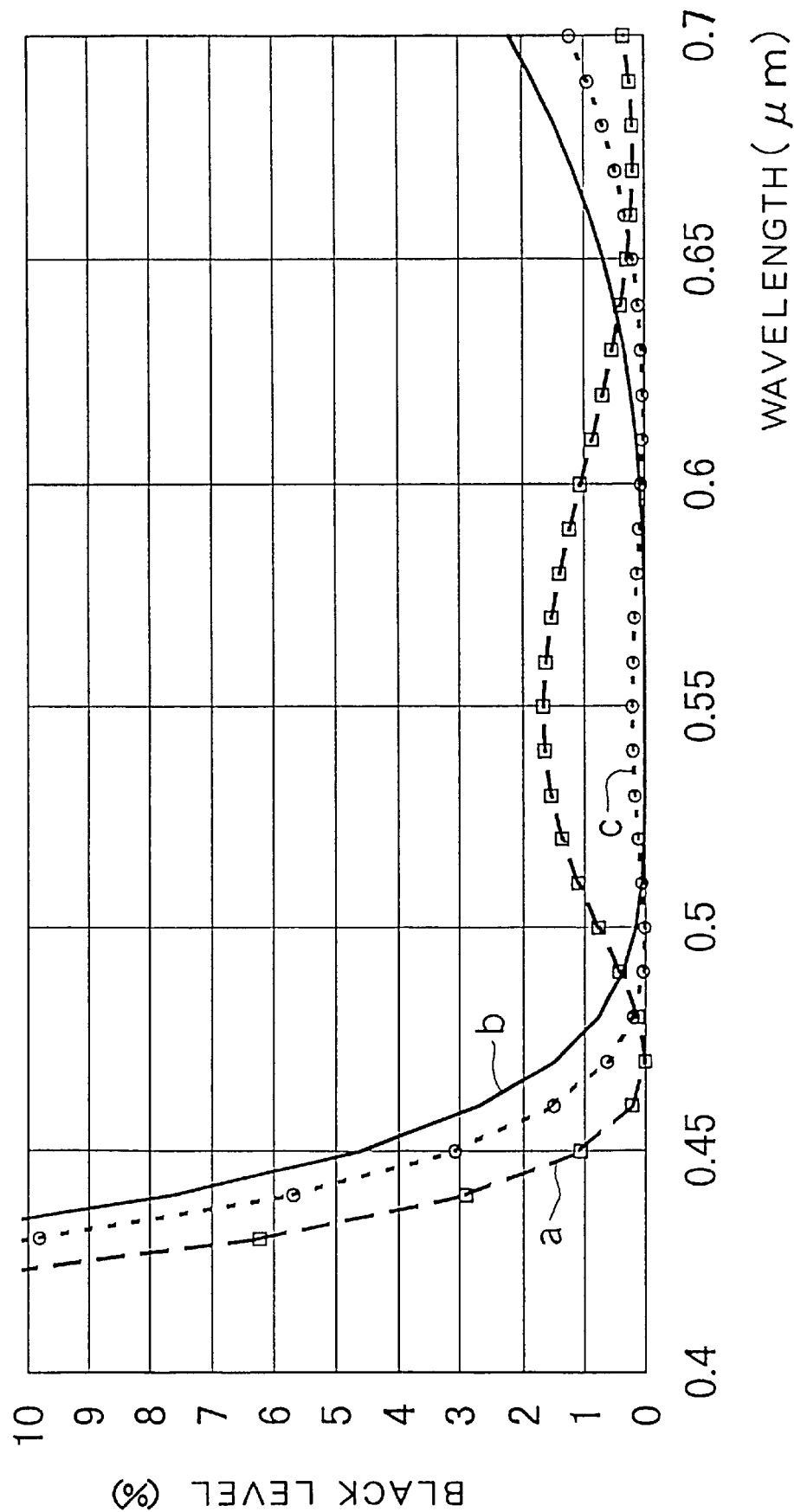
FIG. 7 graphically shows the wavelength dependence when each display panel is optimally adjusted.

FIG. 7 graphically shows the wavelength dependence when each of the display panels for R, G and B is optimally adjusted. Here, the horizontal axis represents the wavelength of the light being used, and the vertical axis represents the ratio of the black level in percent. In this embodiment, to reduce the cost, the first and the second phase plates are common to the display panels for R, G and B. It is assumed that the wavelength range of B (blue) is 0.45 to 0.51 μm, the wavelength range of G (green) is 0.51 to 0.58 μm and the wavelength range of R (red) is 0.58 to 0.67 μm. At this time, when a "remaining phase effects" R/λ of 0.03 is caused by the liquid crystal, the angles between the display panels for R, G and B and the axis of phase retardation of the second phase plate are made different from one another, whereby the ratio of the black level at each display panel can be restrained.

Specifically, when the angle of the axis of phase retardation of the second phase plate is adjusted to 51.3 degrees for B, the ratio of the black level can be restrained approximately to not more than 1% in the wavelength range of B as shown by □ and the broken line a. When the angle of the axis of phase retardation of the second phase plate is adjusted to 47.7 degrees for G, the ratio of the black level can be restrained to be sufficiently low in the wavelength range of G as shown by the solid line b. When the angle of the axis of phase retardation of the second phase plate is adjusted to 48.9 degrees for R, the ratio of the black level can also be restrained to be low in the wavelength range of R as shown by ○ and the dotted line c.

Figure 8:
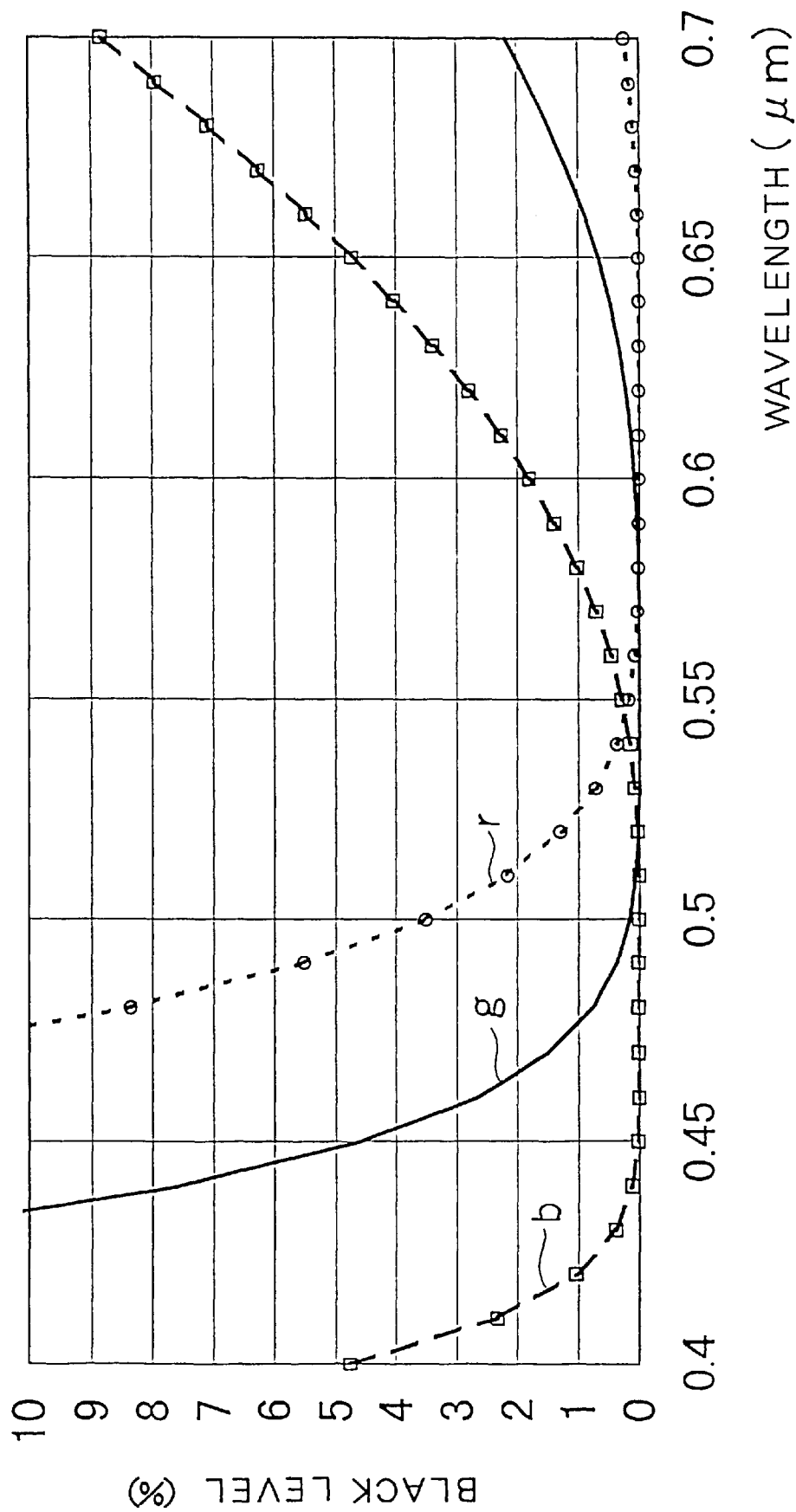
FIG. 8 graphically shows the wavelength dependence when each display panel is provided with its own phase plate.

When each of the display panels for R, G and B is provided with its own first and second phase plates, the ratio of the black level can be restrained to be lower, so that high contrast is obtained. FIG. 8 graphically shows the wavelength dependence after the "remaining phase effects" adjustment when each display panel is provided with its own phase plates. Here, the horizontal axis represents the wavelength of the light being used, and the vertical axis represents the ratio of the black level in percent. Specifically, when the reference wavelength λ0 of the first and the second phase plates specifically provided for the display panel for B is 0.46 μm, the ratio of the black level can be restrained to be sufficiently low in the wavelength range of B as shown by □ and the broken line b.

When the reference wavelength λ0 of the first and the second phase plates specifically provided for the display panel for G is 0.55 μm, the ratio of the black level can also be restrained to be sufficiently low in the wavelength range of G as shown by the solid line g. When the reference wavelength λ0 of the first and the second phase plates specifically provided for the display panel for R is 0.63 μm, the ratio of the black level can also be restrained to be sufficiently low in the wavelength range of R as shown by ○ and the dotted line r. With this structure, the ratio of the black level in each wavelength range is not more than 0.1%, the contrast of the liquid crystal, that is, the extinction ratio is not less than 1000:1, and as a projector display apparatus, an image contrast of not less than 300:1 can be achieved. Thus, excellent images of extremely high contrast are obtained.

Figure 9:
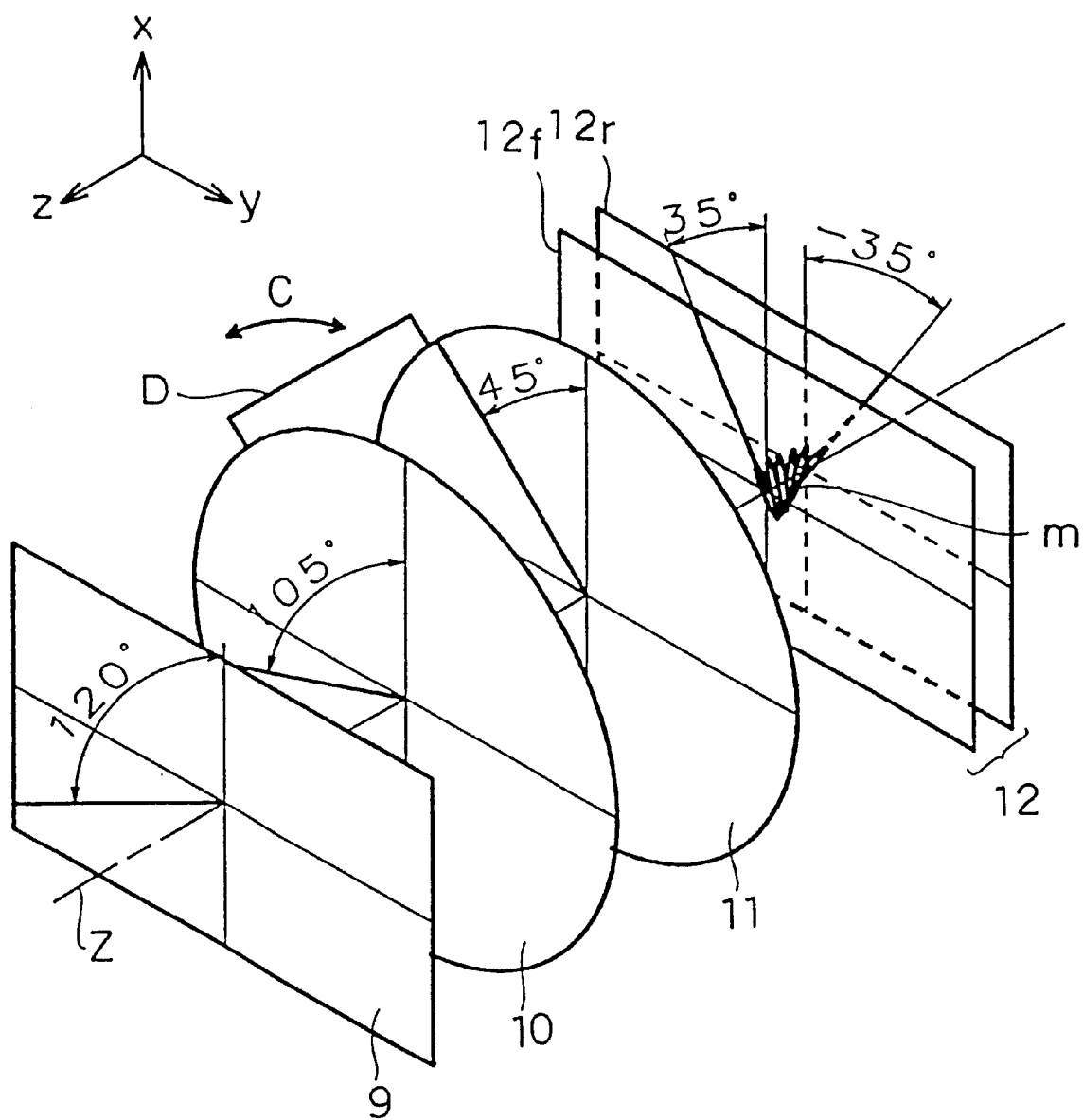
FIG. 9 is a perspective view schematically showing a third embodiment of the display optical apparatus of the present invention.

FIG. 9 is a perspective view schematically showing a third embodiment of the display optical apparatus of the present invention. As shown in the figure, in this embodiment, a polarizing plate 9, a first phase plate 10 which is a half-wave plate, a second phase plate 11 which is a quarter-wave plate (these phase plates together are referred to as a compound phase plate), and a display panel 12 which is a reflective liquid crystal display device are disposed in this order, for example, on the optical axis Z of the projection optical system. In the figure, the coordinates are the same as those shown in FIG. 3.

The liquid crystal used for the display panel 12 is the TN liquid crystal. In this embodiment, the axial direction of the liquid crystal molecules m of the display panel 12 at the time of horizontal alignment is twisted at 35 degrees on the obverse surface 12f and at −35 degrees on the reverse surface 12r. While it is generally known that to use the TN liquid crystal as a reflective liquid crystal display device and cause it to produce a birefringent effect, the angle of twist Φ, that is, the difference between the alignment direction on the obverse surface and the alignment direction on the reverse surface is set at 63.6 degrees; in this embodiment, the angle of twist is 70 degrees which is slightly larger than 63.6 degrees. The reason therefor will be mentioned later.

When a voltage is applied to such TN liquid crystal so that the liquid crystal molecules are vertically aligned, since the axis of phase retardation caused by the liquid crystal molecules not being completely vertical but being slightly inclined as shown in FIG. 14C corresponds substantially to the midpoint between the obverse surface alignment and the reverse surface alignment, it is desirable that the angle thereof be at 45 degrees from the second phase plate, that is, within a range of ±10 degrees from the 0 degrees of FIGS. 3 and 4.

On the contrary, the polarization axis of the polarizing plate 9 is at 120 degrees, the first phase plate 10 has an axis of phase retardation of 105 degrees, and the second phase plate 11 has an axis of phase retardation of 45 degrees. In this embodiment, the first phase plate 10 and the second phase plate 11 are coupled, for example, by a coupling member D and integrally rotated for the adjustment, for example, about the optical axis Z as shown by the arrows C. However, the use of the integrally rotated adjustment mechanism is not limited to the case of the TN liquid crystal, but the mechanism may be used for the cases of the homogeneous liquid crystal and the DAP liquid crystal as well.

By this, the slight amount of so-called "remaining phase effects" due to the alignment of the liquid crystal molecules or the angle of incidence of the incident light on the liquid crystal described with reference to FIGS. 14A to 14C is canceled. In FIG. 9, while the surfaces of the polarizing plate 9, the first phase plate 10 and the second phase plate 11 are vertical to the optical axis Z, the surface of the display panel 12 is inclined away at 3 to 10 degrees along the x-z plane. This is similar to the disposition of the display panel 12 shown in FIG. 1.

Figure 10:
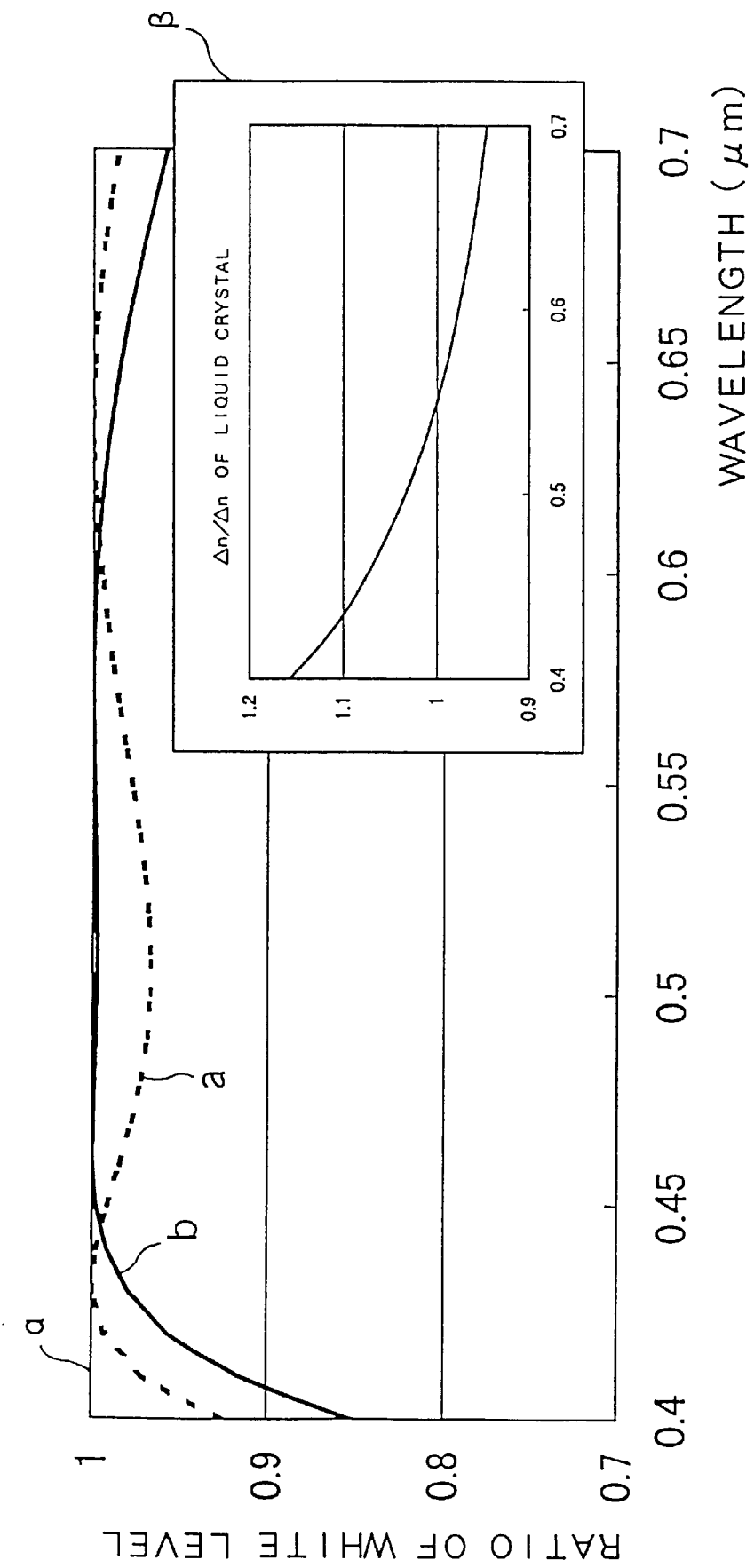
FIG. 10 graphically shows the wavelength dependence of the TN liquid crystal.

FIG. 10 graphically shows the wavelength dependence of the TN liquid crystal. In the graph α, the horizontal axis represents the wavelength of the light being used, and the vertical axis represents the ratio of the white level. In the graph β, the horizontal axis represents the wavelength of the light being used, and the vertical axis represents the ratio of the refractive index difference of the liquid crystal in the case where the reference wavelength is 0.55 μm. Generally, when no voltage is applied to the TN liquid crystal, the direction of alignment remains twisted, and as a reflective liquid crystal display device, the TN liquid crystal acts similarly to a phase plate having an axis of phase retardation of an angle approximately 0.7 times the twist angle Φ from the obverse surface alignment. In this case, when the twist angle Φ is 63.6 degrees, the TN liquid crystal acts similarly to a quarter-wave plate having an axis of phase retardation of exactly 45 degrees. At this time, however, the optical phase difference significantly changes because of the wavelength dependence, so that the ratio of the white level varies according to the wavelength as shown by the broken line a of the figure.

When this happens, in a case where white display is provided when no voltage is applied to the TN liquid crystal, the image efficiency deteriorates, and a problem of coloring, that is, a problem that white display becomes reddish or bluish occurs. The projector optical apparatus of the present invention employs the three-panel structure as embodiments as described above, and a display panel is provided for each of R, G and B. When a display panel comprising liquid crystal specifically prepared for each color is used in order to avoid the above-mentioned problem, the mass production cost increases. Therefore, it is desirable to make do with the same kind of display panels where possible.

Therefore, since the optical phase difference is substantially fixed particularly in a wavelength range of 0.45 to 0.65 μm by setting the twist angle Φ at 65 to 75 degrees (70 degrees in the embodiment), substantially flat performance is obtained where the ratio of the white display is close to one in a predetermined wavelength range as shown by the solid line b. With this structure, the projector optical apparatus is excellent with respect to the image efficiency and the problem of coloring. Here, it is desirable that Δn·d/λ0 be 0.4 to 0.5. In this embodiment, the reference wavelength λ0 is 0.55 μm, and Δn·d is 0.233.

Figure 11:
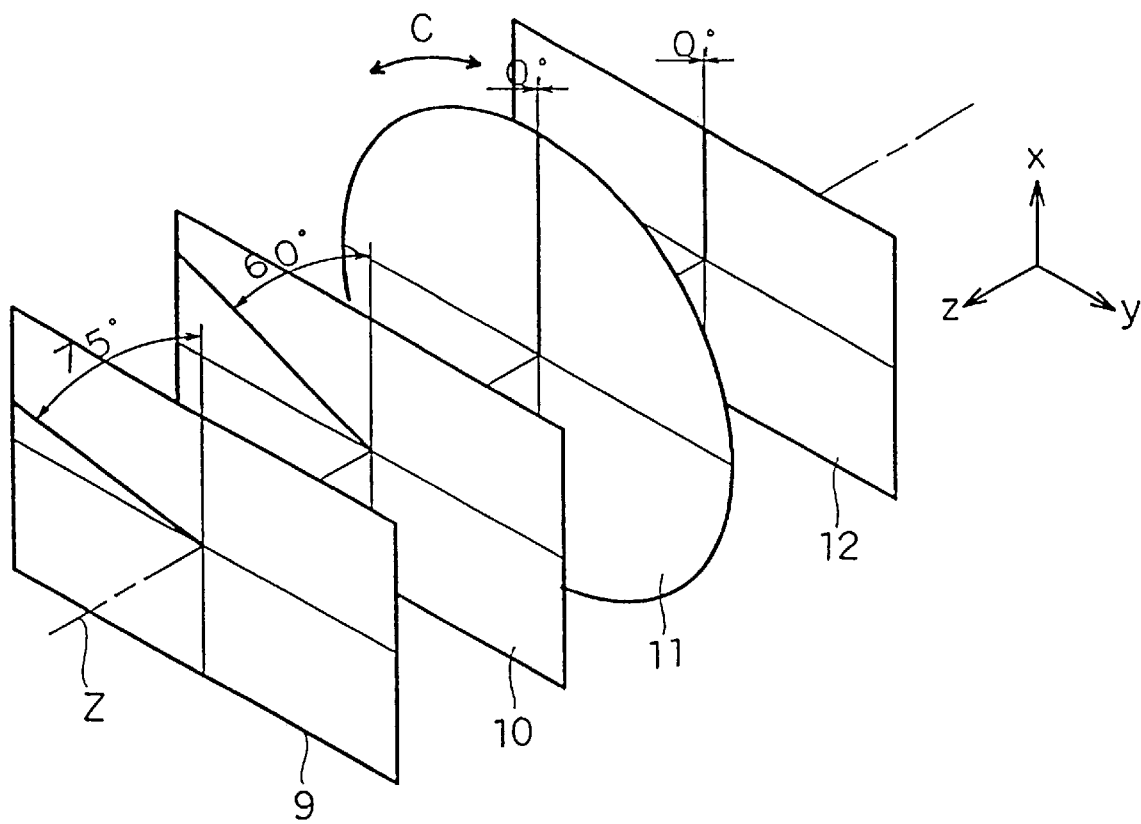
FIG. 11 is a perspective view schematically showing a fourth embodiment of the display optical apparatus of the present invention.

FIG. 11 is a perspective view schematically showing a fourth embodiment of the display optical apparatus of the present invention. As shown in the figure, in this embodiment, a polarizing plate 9, a first phase plate 10 which is a half-wave plate, a second phase plate 11 which is a quarter-wave plate (these phase plates are called compound phase plate together), and a display panel 12 which is a reflective liquid crystal display device are disposed in this order, for example, on the optical axis Z of the projection optical system. In the figure, the coordinates are the same as those shown in FIG. 3.

The liquid crystal used for the display panel 12 is the homogeneous or the DAP liquid crystal. Here, the axial direction of the liquid crystal molecules of the display panel 12 when the liquid crystal molecules are horizontally aligned is 0 degrees, and coincides with the x axis. On the contrary, the polarization axis of the polarizing plate 9 is at 75 degrees, the first phase plate 10 has an axis of phase retardation of 60 degrees, and the second phase plate 11 has an axis of phase retardation of 0 degrees. In this embodiment, the second phase plate 11 is rotated for the adjustment, for example, about the optical axis Z as shown by the arrow C. In FIG. 11, while the surfaces of the polarizing plate 9, the first phase plate 10 and the second phase plate 11 are vertical to the optical axis Z, the surface of the display panel 12 is inclined away at 3 to 10 degrees along the x-z plane. This is similar to the disposition of the display panel 12 shown in FIG. 1.

Figure 12:
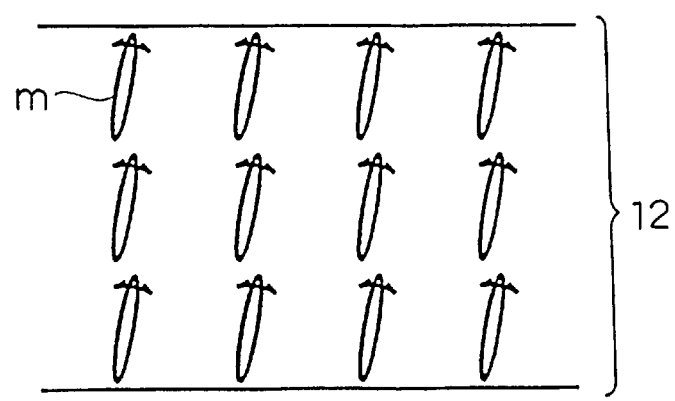
FIG. 12 schematically shows the principle of "remaining phase effects" adjustment with a voltage.

In the structure of the fourth embodiment, the angle between the axis of phase retardation of the second phase plate and the axis of phase retardation of the liquid crystal is 0 degrees, and with this structure as it is, the slight amount of so-called "remaining phase effects" due to the alignment of the liquid crystal molecules or the angle of incidence of the incident light on the liquid crystal described with reference to FIGS. 14A to 14C cannot be canceled. In this embodiment, the phase difference by the second phase plate 11 is actually slightly smaller than one-quarter wave, and by compensating for the phase difference being slightly insufficient because of this with the "remaining phase effects" of the liquid crystal, the phase difference is made one-quarter wavelength in the end. Specifically, as schematically shown in FIG. 12, the liquid crystal molecules m of the display panel 12 are slightly inclined from the vertical alignment, and the inclination is changed by controlling it with the voltage applied to the liquid crystal as shown by the arrows, thereby adjusting the "remaining phase effects".

Moreover, since the second phase plate 11 itself can be adjusted by being rotated, by using this together with the adjustment of the "remaining phase effects" of the liquid crystal, the influence of the phase difference error of the phase plate itself and the like as well as the heretofore described "remaining phase effects" by the liquid crystal and the angular errors of the polarizing plate and the phase plate can be all canceled. The angle between the axis of phase retardation of the second phase plate and the axis of phase retardation of the liquid crystal may be 90 degrees. In this case, the phase difference by the second phase plate 11 is set to be slightly larger than one-quarter wavelength.

In all of the above-described embodiments, in order that the principal ray cross section of the illuminating light and the axis of phase retardation of the liquid crystal coincide with each other, the axis of phase retardation of the liquid crystal is basically 0 degrees. However, the axis of phase retardation of the reflective liquid crystal display device usable for the conventional structure in which a PBS prism is disposed immediately in front of the display panel is frequently set at 45 degrees with respect to the longer and the shorter sides of the display panel. Therefore, when such a reflective liquid crystal display device is used, whether the optical system is structured so as to be suitable for the axis of phase retardation of the reflective liquid crystal display device or for the principal ray cross section is decided according to whether the influence of the oblique incidence of the illuminating light is larger or the influence of the oblique alignment of the liquid crystal molecules is larger.

In any case, in the projector display apparatus of the embodiment shown in FIGS. 1 and 2, in order that the axis of each polarizing plate coincides with the s-polarized light or the p-polarized light of each dichroic mirror, half-wave plates designated as 6 and 6a are disposed between the dichroic mirror and the polarizing plate.

Figure 13:
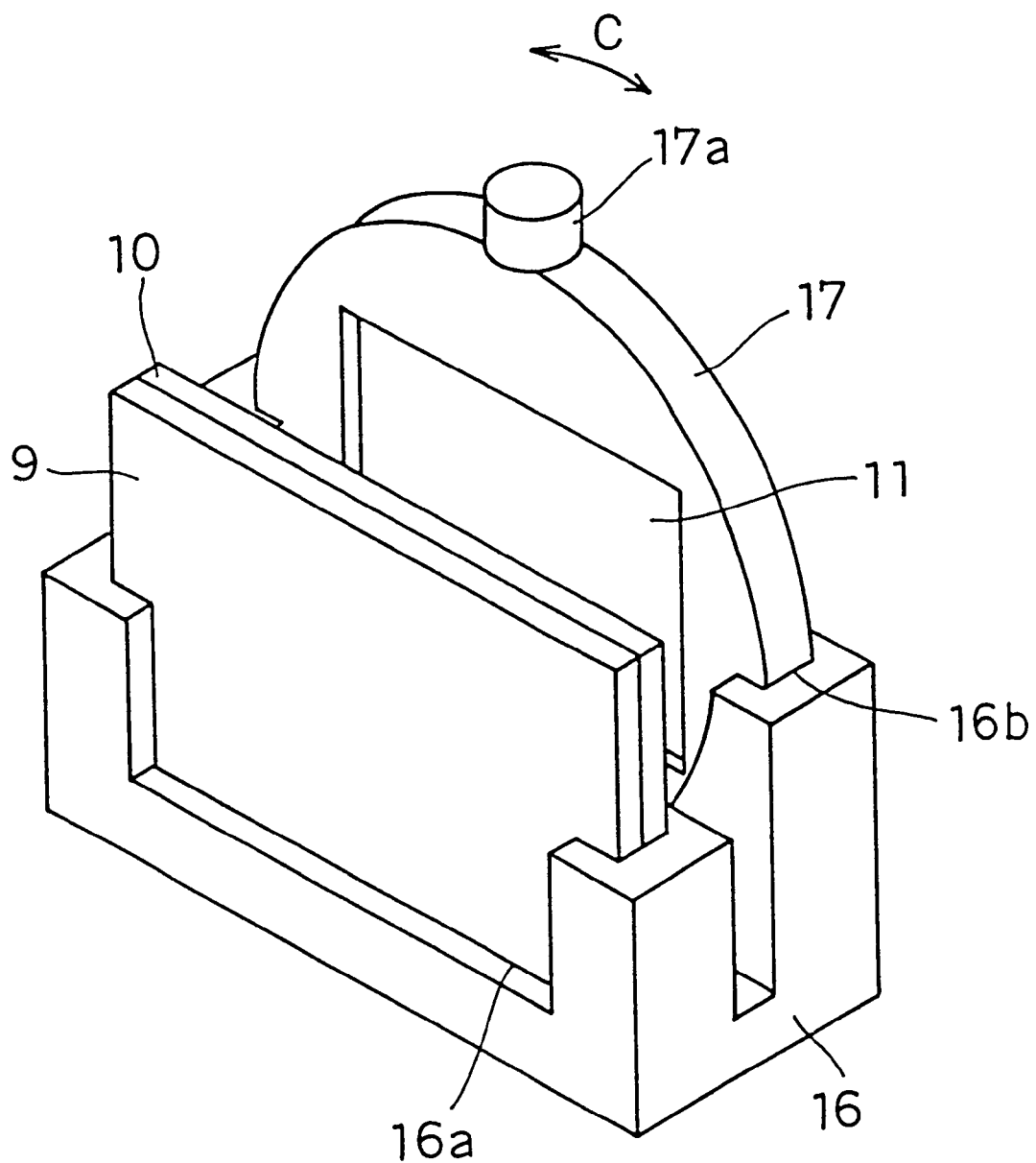
FIG. 13 is a perspective view showing an example of a rotation adjustment mechanism.

FIG. 13 is a perspective view showing an example of the rotation adjustment mechanism used in the display optical apparatus of the present invention. This figure shows the structure in the second or the fourth embodiment as an example. In the figure, reference numeral 16 represents the base of this mechanism, and reference numeral 17 represents a holder for a disk-like phase plate. In a U-shaped engagement portion 16a provided in a front part of the base 16, the polarizing plate 9 and the first phase plate 10 previously cemented together are both fitted at the bottom side and the lower half of each side. In a semicircular engagement portion 16b provided in a rear part of the base 16, the holder 17 is fitted at the lower half of its periphery so as to be rotatable about the center of the disk. In the holder 17, the second phase plate 11 is previously fitted at its peripheral part so that its obverse and reverse surfaces are exposed.

A knob 17a is provided at one position on the periphery of the holder 17. The holder 17 is rotated as shown by the arrow C with the knob 17b being taken with fingers, thereby rotating the second phase plate 11 for the adjustment. After the rotation adjustment, the holder 17 and the engagement portion 16b may be fixed by an adhesive or the like. When the above-described first embodiment is structured by use of this mechanism, for example, in the figure, only the polarizing plate 9 is fitted in the engagement portion 16a, and the phase plate 15 is fitted in the holder 17. When the above-described third embodiment is structured, for example, in the figure, only the polarizing plate 9 is fitted in the engagement portion 16a, and the first phase plate 10 and the second phase plate 11 are both fitted in the holder 17.

Figure 16:
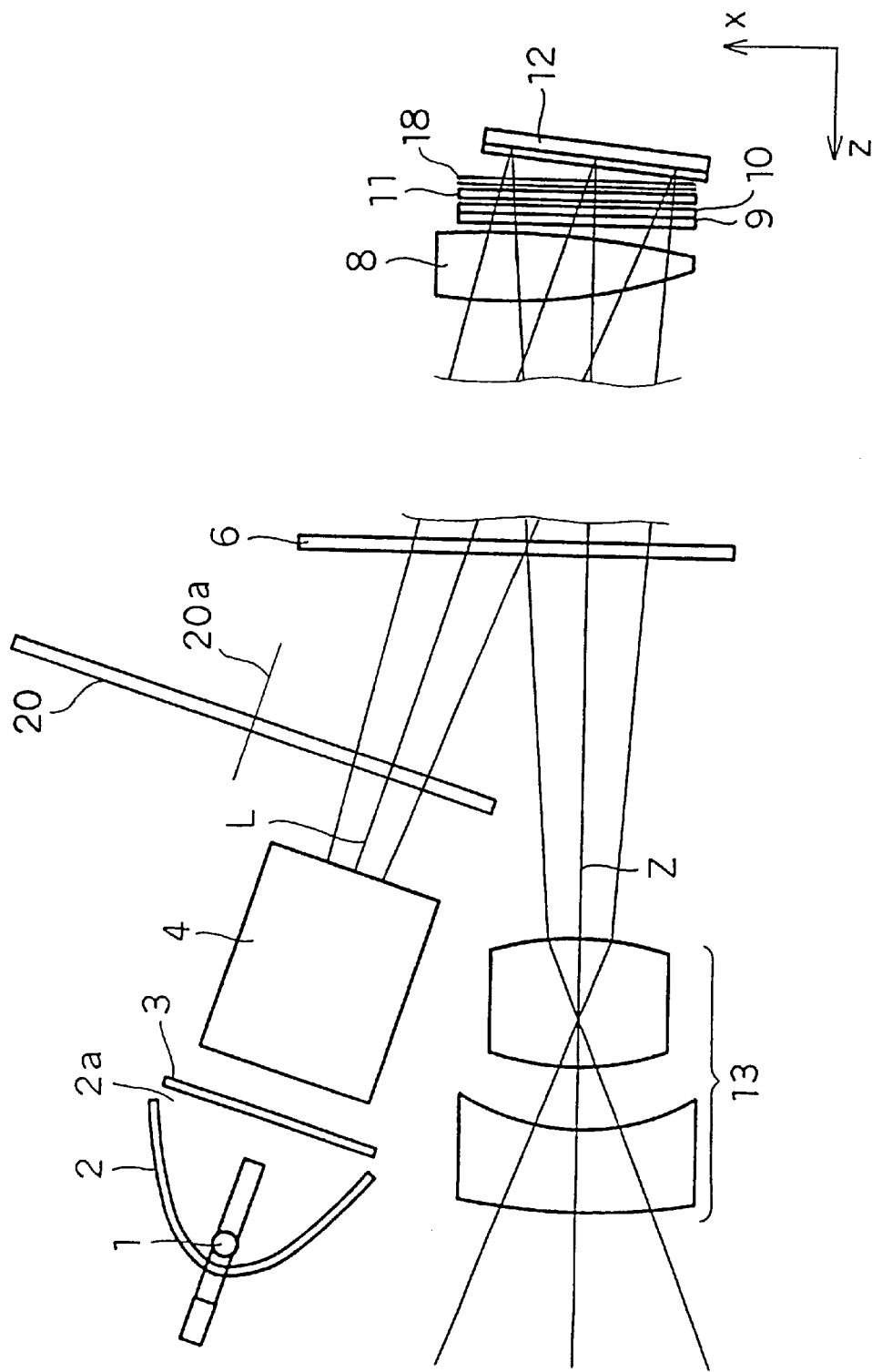
FIG. 16 is a front view showing the principal structure of another embodiment of the projector display apparatus.

FIG. 16 is a front view showing the principal structure of another embodiment of the projector display apparatus using the display optical apparatus of the present invention. In the figure, reference numeral 1 represents a light source, and reference numeral 2 represents a reflector disposed so as to surround the light source 1. Reference numeral 3 represents a UV-IR cut filter being disposed so as to cover the light exit opening 2a of the reflector 2 and cutting ultraviolet rays and infrared rays included in the light from the light source 1 and the reflector 2. In the rear of the UV-IR cut filter 3 (on the right in a downward slanting direction of the figure), an illuminating optical system 4 emitting polarized light having a specific polarization plane as illuminating light is disposed.

In the rear of the illuminating optical system 4, a half-wave plate 6 performing polarization conversion of the illuminating light is disposed. In the rear thereof, a condenser lens 8 whose axis is decentered upward is disposed. The condenser lens 8 condenses the illuminating light on a subsequently-described display panel as incident light, and directs the reflected light from the display panel to a subsequently-described projection optical system as projected light. In the rear of the condenser lens 8, the following elements constituting the display optical apparatus of the present invention are disposed: a polarizing plate 9; a first phase plate 10; a second phase plate 11; a third phase plate 18; and a display panel 12 using a reflective liquid crystal display device.

A disk-like color wheel 20 is disposed between the illuminating optical system 4 and the half-wave plate 6. By the color wheel 20 rotating about the rotation axis 20a at high speed, the illuminating light is switched among R, G and B. That is, in this structure, the display panel 12 is of so-called single-panel type, and in synchronism with the switching of the illuminating light among R, G and B, the display is switched to the one corresponding thereto at high speed. At this time, it is effective to use the ferroelectric liquid crystal having fast response for the display panel 12. Details will be given later.

As shown in the figure, light from the light source 1 and the reflector 2 passes through the UV-IR cut filter 3, the illuminating optical system 4 and the color wheel 20, and then passes through the above-mentioned optical elements 6, 8 to 11 and 18 to be incident on the display panel 12 from the upper left in a slightly slanting direction with its optical axis being the optical axis L. The display panel 12 is disposed so as to be slightly inclined rightward from the vertical direction of the figure. The incident light incident on the display panel 12 is reflected leftward in the horizontal direction of the figure as reflected light and again passes through the optical elements 18, 11 to 8 and 6 in the opposite direction to be directed to the projection optical system 13. The incident light is image-projected as projected light by the projection optical system 13. The optical axis of the projection optical system 13 is designated as Z. As for the coordinates, the leftward direction on the plane of the figure is the z axis, the upward direction is the x axis, and the direction vertical to the plane of the figure and toward this side is the y axis. That is, FIG. 16 shows the x-z plane. In this figure, the optical path between the half-wave plate 6 and the condenser lens 8 is not shown.

Figure 17:
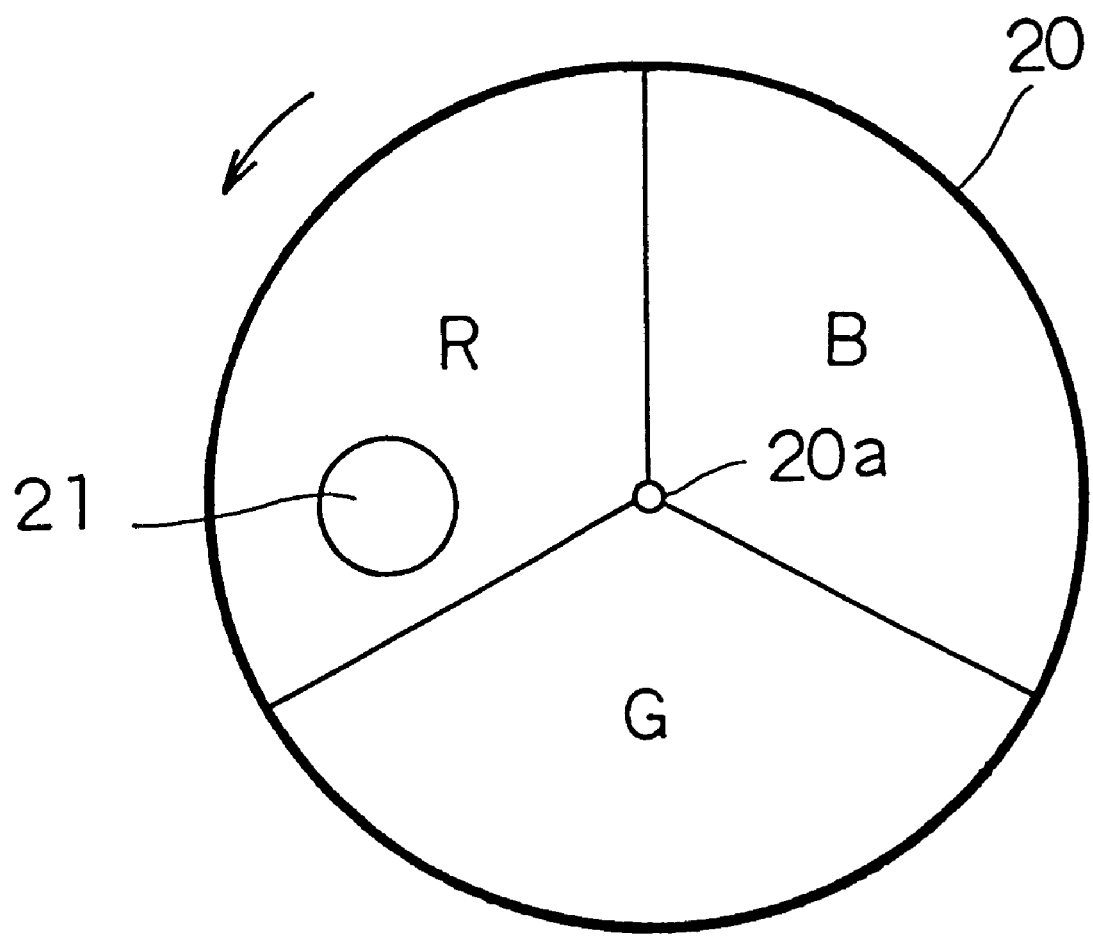
FIG. 17 is a front view schematically showing a color wheel.

FIG. 17 is a front view schematically showing the color wheel. The color wheel 20 has a disk-like shape as shown in the figure, and three filters transmitting R (red), G (green) and B (blue), respectively, are disposed at regular angular intervals about the rotation axis 20a at the center. By these filters rotating about the rotation axis 20a at high speed, for example, in the direction of the arrow, illuminating light transmitted by the color wheel 20 which illuminating light is represented, for example, by a spot 21 is switched among the three colors at high speed by the filters.

When one frame of an image of this projector is, for example, 1/60 second, to provide color display, it is necessary to switch among R, G and B every 1/180 second. By causing the color wheel 20 to make one rotation in 1/60 second, the illuminating light is naturally switched among the three colors every 1/180 second, and the display panel 12 must switch the display to the corresponding one at a speed as high as three times the normal speed in synchronism with the switching among the three colors. At this time, it is effective to use the ferroelectric liquid crystal having fast response. In the projector display apparatus of this embodiment, the ferroelectric liquid crystal is used for the display panel 12.

Figure 18:
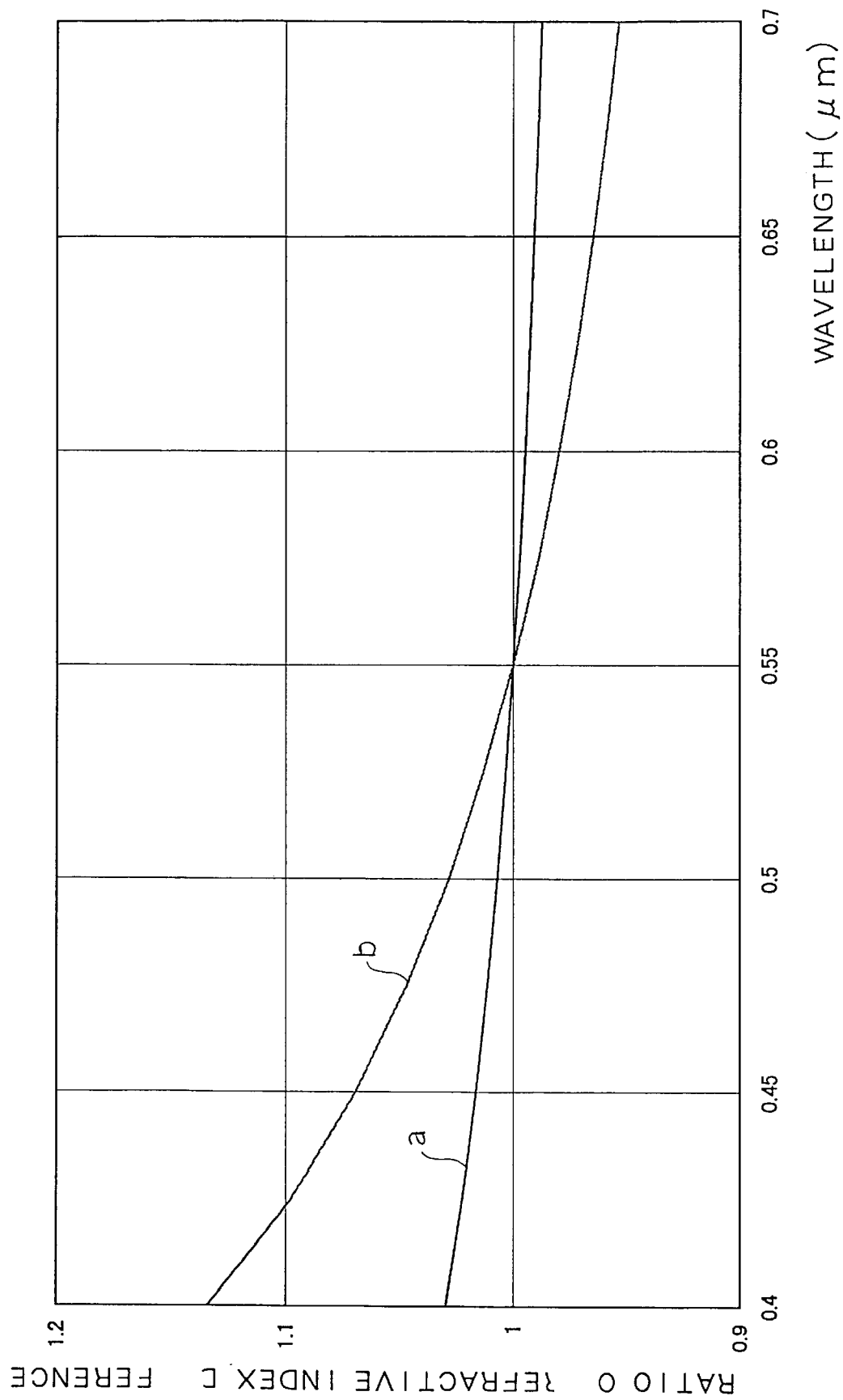
FIG. 18 graphically shows an example of the wavelength dependence of a phase plate and the ferroelectric liquid crystal.

FIG. 18 graphically shows an example of the wavelength dependences of the phase plate and the ferroelectric liquid crystal used in the display optical apparatus constituting the projector display apparatus of this embodiment. In the figure, the horizontal axis represents the wavelength of the light being used, and the vertical axis represents the ratio of the refractive index difference in the case where the reference wavelength is 0.55 $\mu$m. Here, the solid line a represents the characteristic of the phase plate, and the solid line b represents the characteristic of the ferroelectric liquid crystal. As shown in the figure, the ferroelectric liquid crystal exhibits higher wavelength dependence than the phase plate. In the case of the so-called single-panel type, the wavelength range of the light being used is 0.45 to 0.65 $\mu$m, and the characteristic within this range becomes a problem. Since these characteristics vary according to the material being used, it is necessary to optimally design the optical system in accordance with the characteristics.

Figure 19:
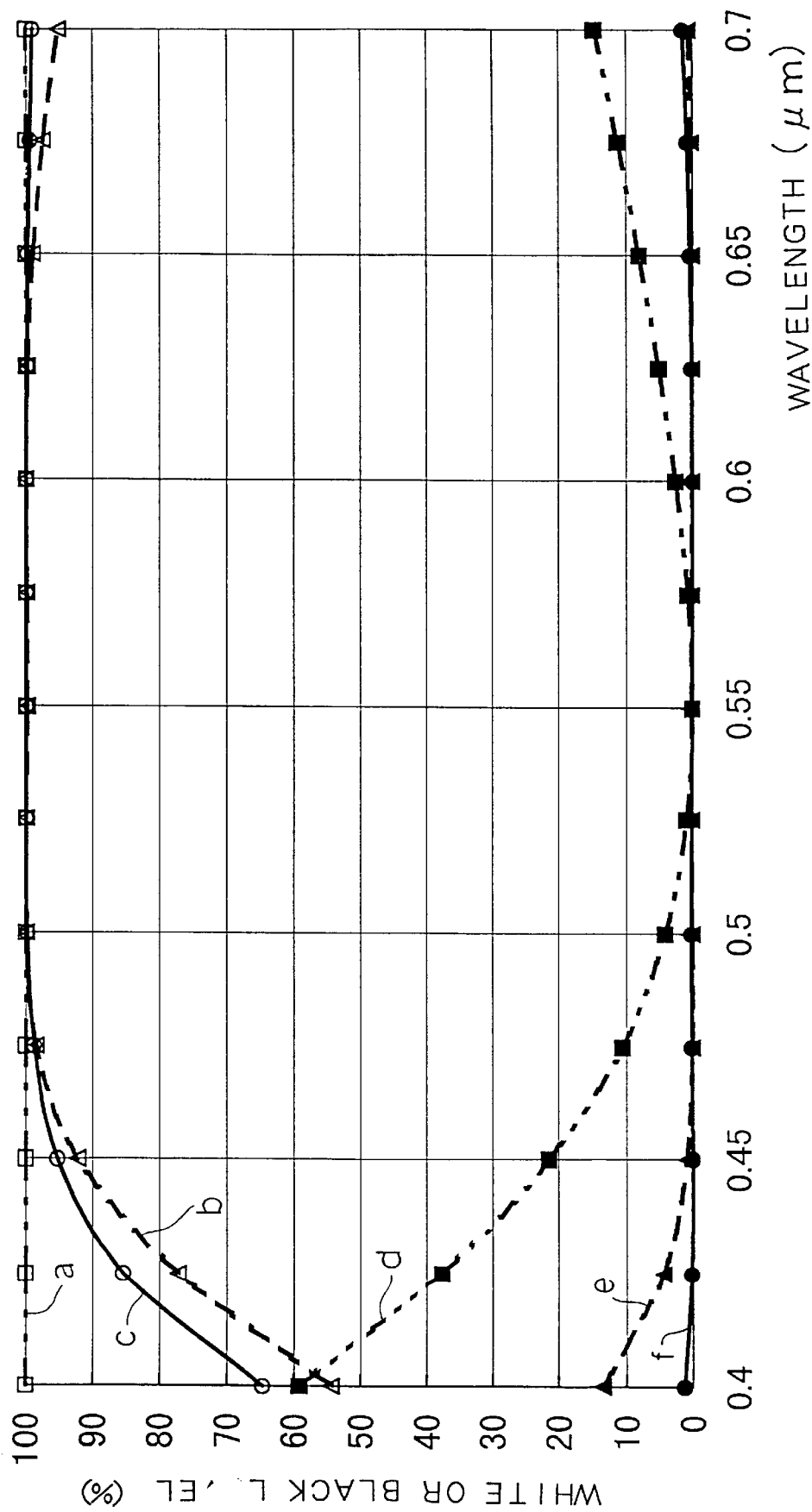
FIG. 19 graphically shows the design wavelength dependence of the display optical apparatus.

FIG. 19 graphically shows the design wavelength dependence of the display optical apparatus constituting the projector display apparatus of this embodiment. In the figure, the horizontal axis represents the wavelength of the light being used, and the vertical axis represents the ratio of the white level or the black level in percent. Here, calculation is performed for both of cases where a phase plate is disposed between the polarizing plate and the display panel and where no phase plate is disposed therebetween. With respect to white display, when there is no phase plate, high white level is maintained over a wide wavelength range as shown by □ and the dash and dotted line a.

When one phase plate is used, the white level considerably decreases particularly on the short wavelength side as shown by Δ and the broken line b. When three phase plates are used, the decrease of the white level is slightly improved as shown by ○ and the solid line c. However, in any case, white level of not less than 90% is maintained in the wavelength range of not less than 0.45 $\mu$m being used.

With respect to black display, when there is no phase plate, the ratio of the black level increases as the wavelength increases or decreases from the reference wavelength 0.55 $\mu$m as shown by ■ and the dash and dotted line d, and the black level is as high as approximately 20% when the wavelength is 0.45 $\mu$m. However, when one phase plate is used, this is considerably improved as shown by ▼ and the broken line e. When three phase plates are used, the black level can be restrained over a wide wavelength range as shown by ● and the solid line f. However, these are design characteristics under an ideal condition.

Figure 20:
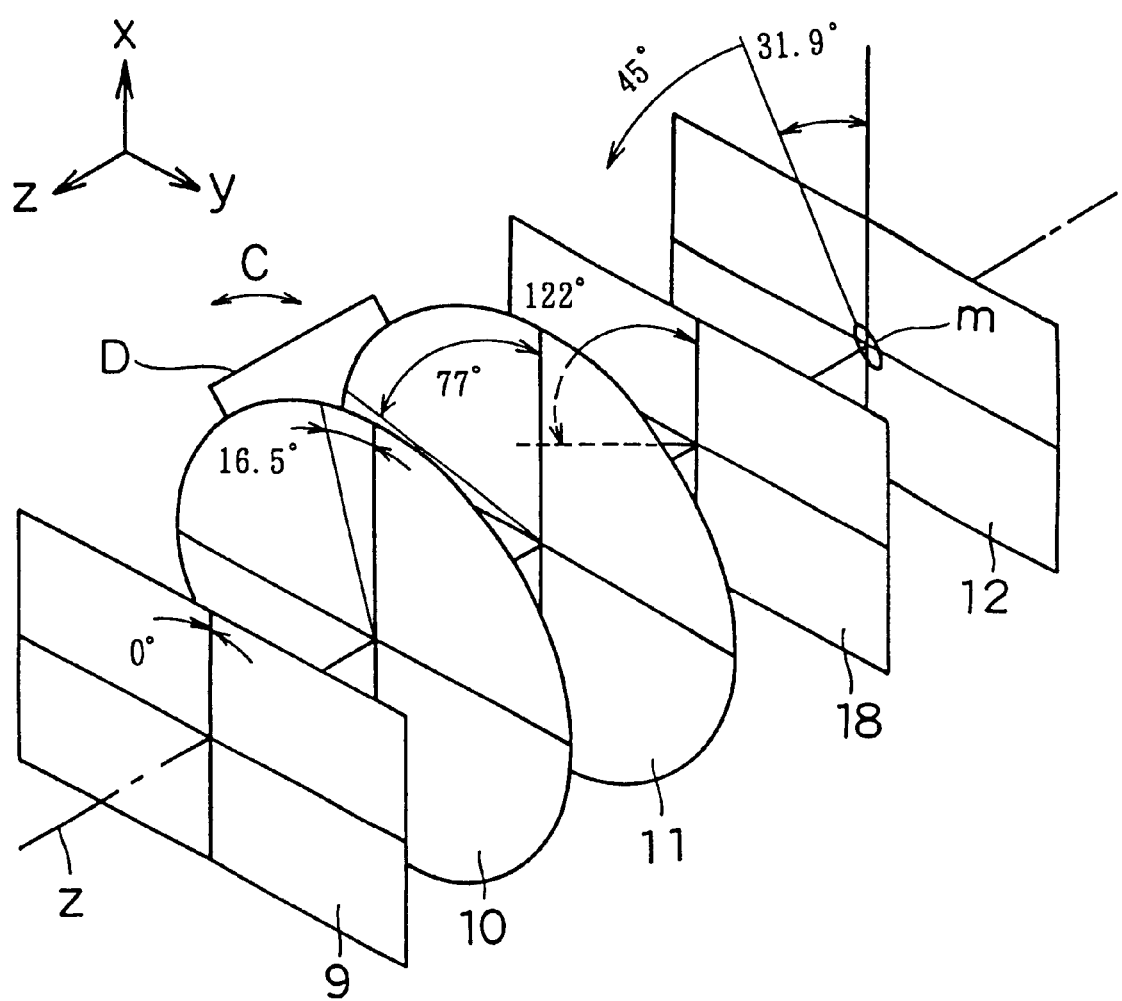
FIG. 20 is a perspective view schematically showing a fifth embodiment of the display optical apparatus of the present invention.

FIG. 20 is a perspective view schematically showing a fifth embodiment of the display optical apparatus of the present invention. As shown in the figure, in this embodiment, a polarizing plate 9, a first phase plate 10 which is a half-wave plate, a second phase plate 11 which is a quarter-wave plate, a third phase plate 18 which is a quarter-wave plate, and a display panel 12 which is a reflective liquid crystal display device and a quarter-wave plate are disposed in this order, for example, on the optical axis Z of the projection optical system. In the figure, as for the coordinates, the projection direction along the optical axis Z is the z axis, the upward direction vertical to the z axis is the x axis, and the rightward direction vertical to the z axis is the y axis. These are the same as the coordinates shown in FIG. 16.

The liquid crystal used for the display panel 12 is the ferroelectric liquid crystal. Here, the polarization axis of the polarizing plate 9 is at 0 degrees, and coincides with the x axis. On the contrary, the first phase plate 10 has an axis of phase retardation of 16.5 degrees, the second phase plate 11 has an axis of phase retardation of 77 degrees, and the third phase plate 18 has an axis of phase retardation of 122 degrees. The axial direction of the liquid crystal molecules m of the display panel 12 is, for example, an axis of phase retardation of 31.9 degrees when the time when black display is provided is regarded as the time when no electric field is applied (OFF), and when white display is provided, an electric field is applied (ON) and the axial direction is an axis of phase retardation to which 45 degrees are further added. At this time, 45 degrees may be subtracted. In this embodiment, the first phase plate 10 and the second phase plate 11 are coupled, for example, by the coupling member D and integrally rotated for the adjustment, for example, about the optical axis Z as shown by the arrow C.

By this, the above-described phase difference error due to the thickness error of the ferroelectric liquid crystal itself and the phase difference error due to a shift of the refractive index difference Δn are canceled. The thickness of the ferroelectric liquid crystal is as small as approximately 1 μm and is very apt to shift from the design value. In FIG. 20, while the surfaces of the polarizing plate 9, the first phase plate 10, the second phase plate 11 and the third phase plate 18 are vertical to the optical axis Z, the surface of the display panel 12 is inclined away at 3 to 10 degrees along the x-z plane. This is similar to the disposition of the display panel 12 shown in FIG. 16.

Figure 21:
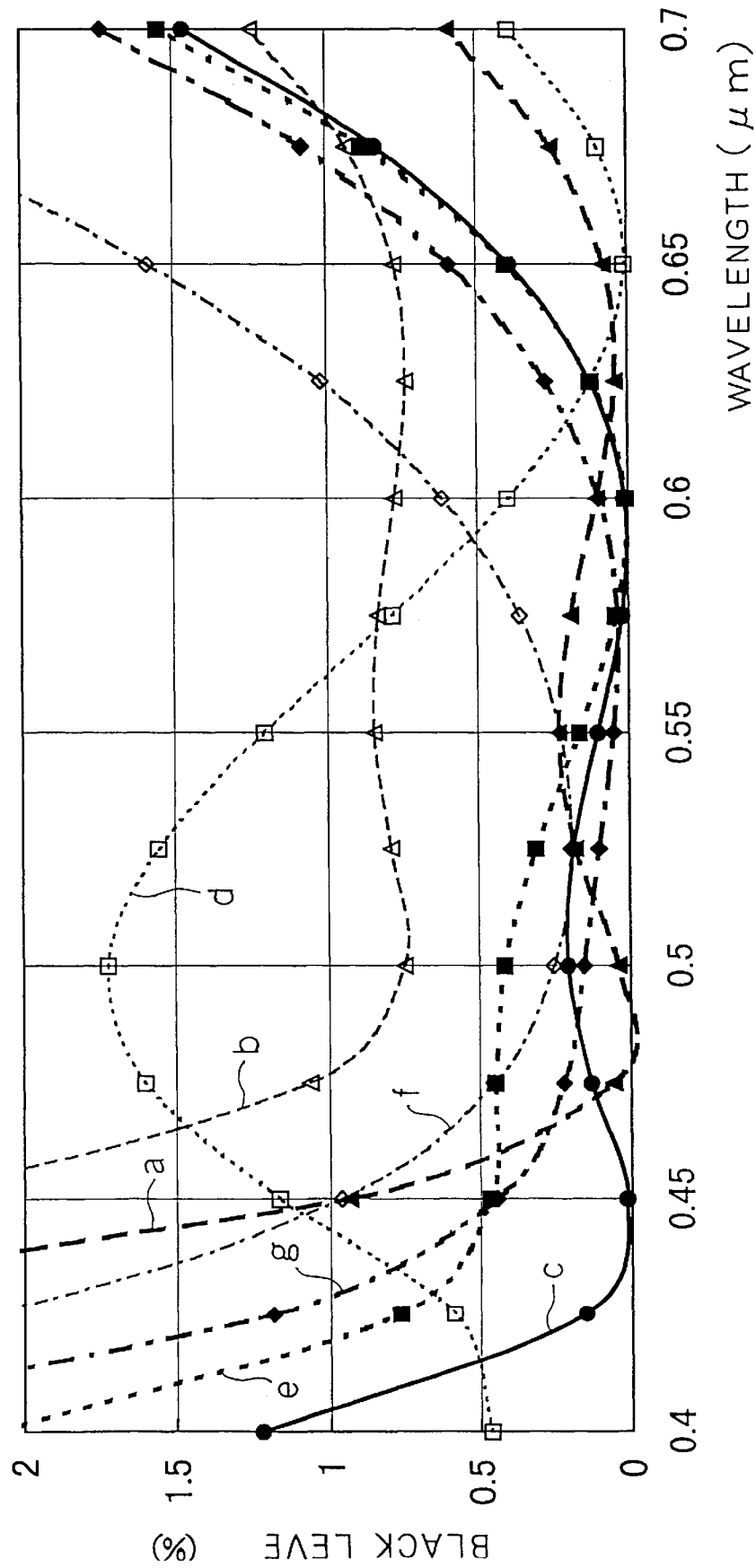
FIG. 21 graphically shows the wavelength dependence in the structure of the fifth embodiment.

FIG. 21 graphically shows the wavelength dependence in the structure of the fifth embodiment. In the figure, the horizontal axis represents the wavelength of the light being used, and the vertical axis represents the ratio of the black level in percent. For comparison, a case where one phase plate is used is shown. When there is no thickness error of the ferroelectric liquid crystal, the ratio of the black level can be restrained to a certain point in the wavelength range of the light being used as shown by ▼ and the thick broken line a. However, when the thickness of the ferroelectric liquid crystal has an error of ±5%, the ratio of the black level increases as shown by Δ and the thin broken line b, so that the contrast decreases. At this time, the ratio of the black level cannot be restrained even if the phase plate is rotated, so that the contrast cannot be increased. This applies to a case where two phase plates are used.

In a case where three phase plates are used, when there is no thickness error of the ferroelectric liquid crystal, the ratio of the black level can be restrained to not more than 0.5% in the wavelength range of the light being used as shown by ● and solid line c. When the thickness of the ferroelectric liquid crystal has an error of ±5%, without the rotation adjustment, the ratio of the black level is high as shown by □ and the thin dotted line d. However, by rotating the first phase plate and the second phase plate for the adjustment, the ratio of the black level can be reduced to not more than 0.5% in the wavelength range of the light being used as shown by ■ and the thick dotted line e.

When the thickness of the ferroelectric liquid crystal has an error of −5%, without any rotation adjustment, the ratio of the black level is high as shown by ◊ and the thin dash and dotted line f. However, by rotating the first phase plate and the second phase plate for the adjustment, the ratio of the black level can be reduced substantially to not more than 0.5% in the wavelength range of the light being used as shown by ♦ and the thick dash and dotted line g. While calculation is performed for the cases of the thickness errors of ±5% in the figure, even when a thickness error of ±10% is caused, by rotating the first phase plate and the second phase plate for the adjustment, the ratio of the black level can be restrained to not more than 1% in the wavelength range of the light being used.

In this embodiment, as shown in FIG. 20, the angle between the axis of the second phase plate 11 and the axis of the third phase plate 18 is 45 degrees, the plates 11 and 18 are both quarter-wave plates and the angular relationship therebetween is adjusted, whereby the phase difference error of the ferroelectric liquid crystal can be adjusted. Empirically, excellent adjustment can be performed when the sum of the phase difference of the second phase plate and the phase difference of the third phase plate is in a range of 0.3 to 0.7 and the angle between the second phase plate and the third phase plate is 20 to 50 degrees.

In this embodiment, it is desirable to cement the third phase plate 18 to the surface of the display panel 12. By doing this, flare or the like due to the surface reflection of the illuminating light at the display panel 12 can be reduced. In phase plates and display panels, the surface reflection at the boundary surface with air is generally large. However, by cementing phase plates, or a display panel and a phase plate together, the surface reflection is reduced at the cemented surfaces. When no phase plate is cemented to the display panel 12, much reflection occurs at the surface of the display panel 12. Since the reflected light passes through the third phase plate 18, the second phase plate 11 and the first phase plate 10 so that the polarization plane thereof substantially coincides with the polarization plane of the polarizing plate 9, the reflected light passes through the polarizing plate 9. Then, the reflected light is directed to the projection optical system 13 shown in FIG. 16 and becomes flare in the end.

When the third phase plate 18 is cemented to the display panel 12, much reflection occurs at the surface of the third phase plate 13. However, since the reflected light passes through the second phase plate 11 and the first phase plate 10 so that the polarization plane thereof is at substantially 90 degrees with respect to the polarization plane of the polarizing plate 9, the reflected light is intercepted at the polarizing plate 9, so that the reflected light does not become flare. Although surface reflection also occurs at the polarizing plate 9 and the first phase plate 10, since the polarizing plate 9 and the first phase plate 10 are inclined at several degrees with respect to the display panel 12, the reflected light therefrom is not incident on the projection optical system 13. Since the first phase plate 10 and the second phase plate 11 are integrally rotated for the adjustment, they are normally cemented together.

In the ferroelectric liquid crystal constituting the display panel 12 of this embodiment, there are cases where the liquid crystal is oppositely driven in appropriate timing in order to stabilize the operation. This is to rotate the optical axis by 45 degrees for each pixel so that, for example, white display condition is changed to black display condition and black display condition is changed to white display condition. That is, at the time of the opposite driving, since white and black are reversed, it cannot be helped that the contrast decreases apparently. Therefore, by forming the third phase plate 18 of the same ferroelectric liquid crystal, driving the entire surface at the same time in accordance with the timing of the opposite driving and rotating the optical axis by 45 degrees, correct display can be provided even in the condition where the display panel 12 is oppositely driven.

Figure 22:
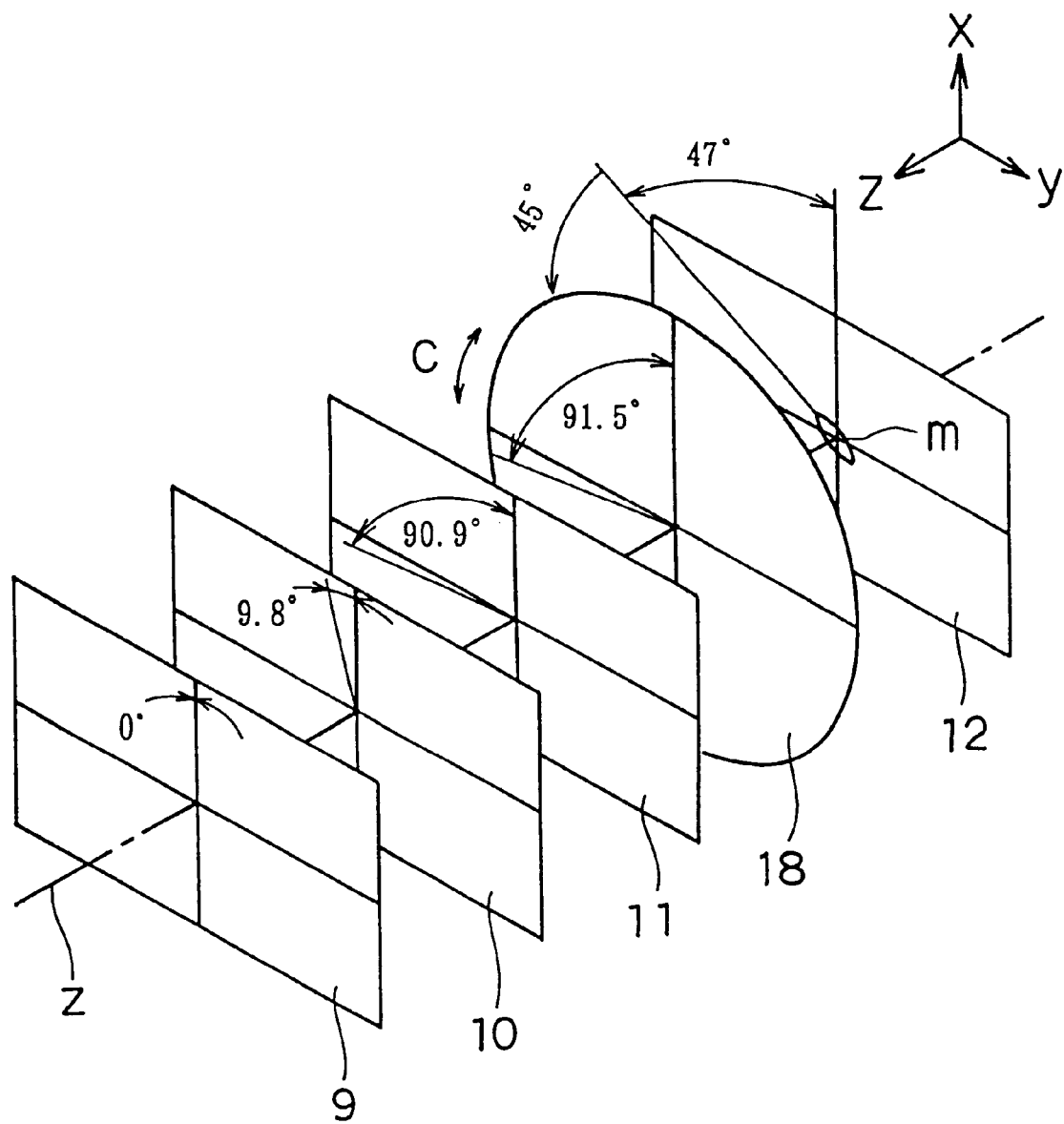
FIG. 22 is a perspective view schematically showing a sixth embodiment of the display optical apparatus of the present invention.

FIG. 22 is a perspective view schematically showing a sixth embodiment of the display optical apparatus of the present invention. As shown in the figure, in this embodiment, a polarizing plate 9, a first phase plate 10 which is a one-wave plate, a second phase plate 11 which is a three-eighths-wave plate, a third phase plate 18 which is a one-eighth-wave plate, and a display panel 12 which is a reflective liquid crystal display device and a quarter-wave plate are disposed in this order, for example, on the optical axis Z of the projection optical system. In the figure, the coordinates are the same as those shown in FIG. 20.

The liquid crystal used for the display panel 12 is the ferroelectric liquid crystal. Here, the polarization axis of the polarizing plate 9 is at 0 degrees, and coincides with the x axis. On the contrary, the first phase plate 10 has an axis of phase retardation of 9.8 degrees, the second phase plate 11 has an axis of phase retardation of 90.9 degrees, and the third phase plate 18 has an axis of phase retardation of 91.5 degrees. The axial direction of the liquid crystal molecules m of the display panel 12 is, for example, an axis of phase retardation of 47 degrees when the time when black display is provided is regarded as the time when no electric field is applied (OFF), and when white display is provided, an electric field is applied (ON) and the axial direction is an axis of phase retardation to which 45 degrees are further added. At this time, 45 degrees may be subtracted. In this embodiment, the third phase plate 18 is integrally rotated for the adjustment, for example, about the optical axis Z as shown by the arrow C.

By this, the above-described phase difference error due to the thickness error of the ferroelectric liquid crystal itself and the phase difference error due to a shift of the refractive index difference Δn are canceled. The thickness of the ferroelectric liquid crystal is as small as approximately 1 μm and is very apt to shift from the design value. In FIG. 22, while the surfaces of the polarizing plate 9, the first phase plate 10, the second phase plate 11 and the third phase plate 18 are vertical to the optical axis Z, the surface of the display panel 12 is inclined away at 3 to 10 degrees along the x-z plane. This is similar to the disposition of the display panel 12 shown in FIG. 16.

Figure 23:
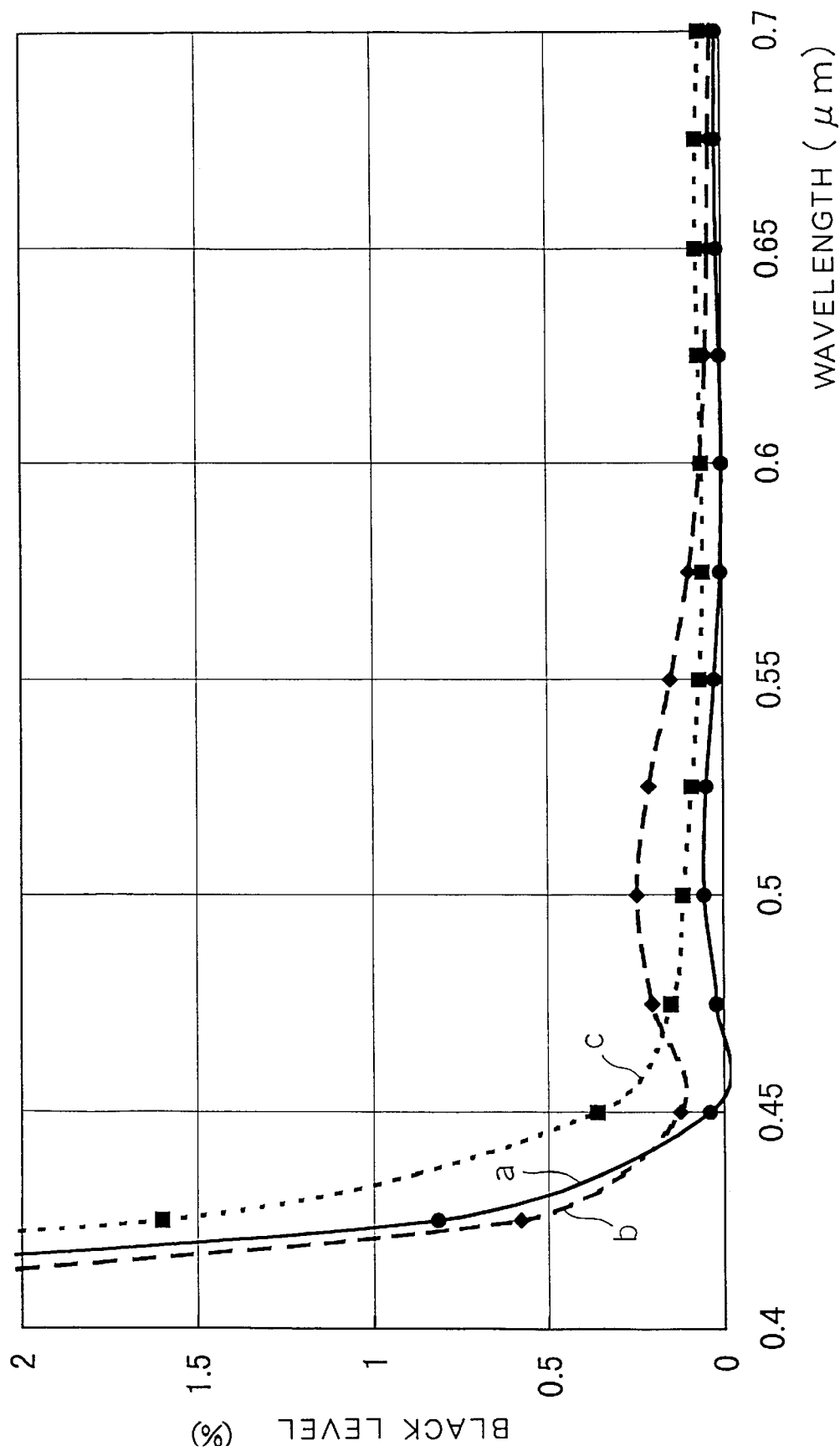
FIG. 23 graphically shows the wavelength dependence in the structure of the sixth embodiment.

FIG. 23 graphically shows the wavelength dependence in the structure of the sixth embodiment. In the figure, the horizontal axis represents the wavelength of the light being used, and the vertical axis represents the ratio of the black level in percent. In a case where three phase plates are used, when there is no thickness error of the ferroelectric liquid crystal, the ratio of the black level can be sufficiently restrained in the wavelength range of the light being used as shown by ● and the solid line a. When the thickness of the ferroelectric liquid crystal has an error of −5%, by rotating the third phase plate for the adjustment, the ratio of the black level can be reduced to not more than 0.5% in the wavelength range of the light being used as shown by ♦ and the broken line b. When the thickness of the ferroelectric liquid crystal has an error of ±5%, by rotating the third phase plate for the adjustment, the ratio of the black level can be reduced to not more than 0.5% in the wavelength range of the light being used as shown by ■ and the dotted line c.

In this embodiment, the first phase plate 10 is a one-wave plate and the axial directions of the second phase plate 11 and the third phase plate 18 are substantially the same, whereby the black level can be improved more than in the fifth embodiment. Empirically, in a case where the phase difference of the first phase plate is approximately one, excellent adjustment can be performed when the sum of the phase difference of the second phase plate and the phase difference of the third phase plate is in a range of 0.3 to 0.7 and the phase difference of the third phase plate is smaller. Moreover, excellent adjustment can be performed when the angle between the second phase plate and the third phase plate is within ±20 degrees.

In this embodiment, since the third phase plate 18 is rotated for the adjustment, it is impossible to reduce flare or the like by cementing the third phase plate 18 to the display panel 12. Therefore, the gap between the third phase plate 18 and the display panel 12 is filled with a high-refractive-index liquid such as ethylene glycol. By doing this, flare or the like due to the surface reflection of the illuminating light at the display panel 12 can be reduced like in the case where the phase plate is cemented.

While the first to the third phase plates have the same wavelength dependence of the reflective index difference in the fifth and the sixth embodiments, there are cases where it is preferable for the first to the third phase plates to have different wavelength dependences of the reflective index difference according to the wavelength dependence of the reflective index difference of the ferroelectric liquid crystal. In the fifth embodiment, the angle between the first phase plate and the second phase plate and the angle between the third phase plate and the ferroelectric liquid crystal are each optimally set in accordance with the wavelength dependence of the refractive index difference.

While the fifth and the sixth embodiments are of the so-called single-panel type and one display panel covers light of a wide wavelength range, needless to say, the structures of these embodiments may be used for the so-called three-panel type. At this time, it is unnecessary to prepare ferroelectric liquid crystal having a different phase difference for each wavelength range being handled; one type of ferroelectric liquid crystal can be used for all of R, G and B.

By structuring the display optical apparatus so that the angles of the axes of two phase plates of the first to the third phase plates are independently rotated for the adjustment, not only the phase difference error of the ferroelectric liquid crystal but also the phase differences of the phase plates can be adjusted and absorbed. Further, by providing four phase plates, the black level can naturally be restrained more, and even when the phase difference error of the ferroelectric liquid crystal is larger than that described above, the black level can be restrained to be within a predetermined level.

While in the fifth and the sixth embodiments, ferroelectric liquid crystal is used for the display panel and a birefringent effect is produced at the time of both ON and OFF so that the liquid crystal acts as a phase element as heretofore described, the direction of the optical axis thereof differs between at the time of ON and OFF. The use of the structures of these embodiments is not limited to the case where ferroelectric liquid crystal is used, but liquid crystal producing a birefringent effect only at the time of either ON or OFF such as the TN liquid crystal, the homogeneous liquid crystal and the DAP liquid crystal used in the first to the fourth embodiments may be used. However, in these cases, it is necessary to provide black display when the liquid crystal molecules are horizontally aligned, that is, when a birefringent effect is produced so that the liquid crystal acts as a phase element.

The principal axis recited in the claims corresponds to the optical axes of the phase plates and the liquid crystal in the embodiments.

What is claimed is:

1. A display optical apparatus comprising:
   a polarizing plate transmitting illuminating light having a predetermined polarization direction;
   a reflective liquid crystal display device reflecting the illuminating light transmitted by the polarizing plate as projected light of a polarization condition that differs according to pixel information for each pixel; and
   a plurality of phase plates changing polarization conditions of the illuminating light and the projected light and directing the illuminating light and the projected light to the polarizing plate, said plurality of phase plates being disposed between the reflective liquid crystal display device and the polarizing plate;
   wherein a black level of the projected light is adjusted by rotating a principal axis direction of some or all of the plurality of phase plates.

2. A display optical apparatus as claimed in claim 1, wherein the phase plate adjoining the reflective liquid crystal display device is a quarter-wave plate, and an angle between the principal axis direction of the phase plate and a principal axis direction of liquid crystal molecules of the reflective liquid crystal display device when the liquid crystal molecules are horizontally aligned is 45 degrees plus or minus 10 degrees.

3. A display optical apparatus as claimed in claim 2, wherein the reflective liquid crystal display device is of a homogeneous type or a DAP type.

4. A display optical apparatus as claimed in claim 1, wherein the phase plate adjoining the reflective liquid crystal display device is a quarter-wave plate, an angle between the principal axis direction of the phase plate and a principal axis direction of liquid crystal molecules of the reflective liquid crystal display device when the liquid crystal molecules are horizontally aligned is 0 degrees plus or minus 10 degrees, and a phase difference by the phase plate is smaller than one-quarter wavelength.

5. A display optical apparatus as claimed in claim 4, wherein the reflective liquid crystal display device is of a homogenous type or a DAP type.

6. A display optical apparatus as claimed in claim 1, wherein the phase plate adjoining the reflective liquid crystal display device is a quarter-wave plate, an angle between the principal axis direction of the phase plate and a principal axis direction of liquid crystal molecules of the reflective liquid crystal display device when the liquid crystal molecules are horizontally aligned is 90 degrees plus or minus 10 degrees, and a phase difference by the phase plate is larger than one-quarter wavelength.

7. A display optical apparatus as claimed in claim 6, wherein the reflective liquid crystal display device is of a homogenous type or a DAP type.

8. A display optical apparatus as claimed in claim 1, wherein the reflective liquid crystal display device is of a twisted nematic type, and a twist angle thereof is 65 to 75 degrees, and $\Delta n \cdot d/\lambda 0$ is 0.4 to 0.5, where:
$\Delta n$ is a refractive index difference of liquid crystal;
d is a thickness; and
$\lambda 0$ is a reference wavelength.

9. A display optical apparatus as claimed in claim 8, wherein at least one phase plate disposed proximate the reflective liquid crystal display device is a quarter-wave plate, and a phase retardation angle of the at least one phase plate is 45 degrees plus or minus 10 degrees.

10. A display optical apparatus as claimed in claim 1, wherein the phase plate adjoining the reflective liquid crystal display device is a quarter-wave plate, and an angle between the principal axis direction of the phase plate and a principal ray cross section formed by the illuminating light and the projected light is 45 degrees plus or minus 10 degrees.

11. A display optical apparatus as claimed in claim 1, wherein the reflective liquid crystal display device is of a ferroelectric type or an antiferroelectric type.

12. A display optical apparatus as claimed in claim 1, wherein three phase plates are provided, a sum of phase differences of second and third phase plates from a side of the polarizing plate is within a range of 0.3 to 0.7, and an angle between principal axis directions of the phase plates is within a range of 20 to 50 degrees.

13. A display optical apparatus as claimed in claim 12, wherein the reflective liquid crystal display device is of a ferroelectric type.

14. A display optical apparatus as claimed in claim 1, wherein three phase plates are provided, a first phase plate from a side of the polarizing plate is one-wave plate, a sum of phase differences of second and third phase plates from the side of the polarizing plate is within a range of 0.3 to 0.7, the phase difference of the third phase plate is smaller than the phase difference of the second phase plate, and an angle between principal axis directions of the phase differences is within a range of plus or minus 20 degrees.

15. A display optical apparatus as claimed in claim 14, wherein the reflective liquid crystal display device is of a ferroelectric type.

16. A projector display apparatus comprising:
a projection optical system; and
a display optical apparatus, wherein said display optical apparatus includes:
a polarizing plate transmitting illumination light having a predetermined polarization direction;
a reflective liquid crystal display device reflecting the illuminating light transmitted by the polarizing plate as projected light of a polarization condition that differs according to pixel information for each pixel; and
a plurality of phase places changing polarization conditions of the illuminating light and the projected light and directing the illuminating light and the projected light to the polarizing plate, said plurality of phase plates being disposed between the reflective liquid crystal display device and the polarizing plate,
wherein a black level of the projected light is adjusted by rotating a principal axis direction of some or all of the plurality of phase plates.

17. A projector display apparatus as claimed in claim 16, wherein the reflective liquid crystal display device is of a twisted nematic type, and a twist angle thereof is 65 to 75 degrees, and $\Delta n \cdot d/\lambda 0$ is 0.4 to 0.5, where:
$\Delta n$ is a refractive index difference of liquid crystal;
d is a thickness; and
$\lambda 0$ is a reference wavelength.

18. A projector display apparatus as claimed in claim 16, wherein the phase plate adjoining the reflective liquid crystal display device is a quarter-wave plate, and an angle between the principal axis direction of the phase plate and a principal ray cross section formed by the illuminating light and the projected light is 45 degrees plus or minus 10 degrees.

19. A projector display apparatus as claimed in claim 16, wherein the reflective liquid crystal display device is of a ferroelectric type or an antiferroelectric type.

20. A projector display apparatus as claimed in claim 16, wherein three phase plates are provided, a sum of phase differences of second and third phase plates from a side of the polarizing plate is within a range of 0.3 to 0.7, and an angle between principal axis directions of the phase plates is within a range of 20 to 50 degrees.

21. A projector display apparatus as claimed in claim 16, wherein three phase plates are provided, a first phase plate from a side of the polarizing plate is one-wave plate, a sum of phase differences of second and third phase plates from the side of the polarizing plate is within a range of 0.3 to 0.7, the phase difference of the third phase plate is smaller than the phase difference of the second phase plate, and an angle between principal axis directions of the phase differences is within a range of plus or minus 20 degrees.

* * * * *

UNITED STATES PATENT AND TRADEMARK OFFICE
CERTIFICATE OF CORRECTION

PATENT NO. : 6,624,862 B1
DATED : September 23, 2003
INVENTOR(S) : Kohtaro Hayashi et al.

It is certified that error appears in the above-identified patent and that said Letters Patent is hereby corrected as shown below:

Column 2,
Line 23, delete "is", and insert -- a --.
Line 27, delete "surface", and insert -- surfaces --.
Lines 29 and 34, delete the numeral "1", and insert the lower case letter -- 1 --.

Column 19,
Line 31, delete "±5%", and insert -- +5% --.

Column 21,
Line 32, delete "±5%", and insert -- +5% --.

Column 22,
Line 51, after "of", insert -- independently rotatable --.

Column 24,
Line 15, delete "illumination", and insert -- illuminating --.
Line 22, after "of", delete "phase places", and insert -- independently rotatable phase plates --.

Signed and Sealed this

Twenty-fourth Day of August, 2004

JON W. DUDAS
*Director of the United States Patent and Trademark Office*